United States Patent
Salsbury et al.

(10) Patent No.: US 10,579,023 B2
(45) Date of Patent: *Mar. 3, 2020

(54) FEEDBACK CONTROL SYSTEM WITH NORMALIZED PERFORMANCE INDICES FOR SETPOINT ALARMING

(71) Applicant: Johnson Controls Technology Company, Auburn Hills, MI (US)

(72) Inventors: Timothy I. Salsbury, Whitefish Bay, WI (US); Carlos Felipe Alcala Perez, Mexico City (MX); Michael J. Ajax, Milwaukee, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/230,795

(22) Filed: Dec. 21, 2018

(65) Prior Publication Data

US 2019/0146423 A1 May 16, 2019

Related U.S. Application Data

(63) Continuation of application No. 14/961,747, filed on Dec. 7, 2015, now Pat. No. 10,197,977, which is a (Continued)

(51) Int. Cl.
*G05B 11/42* (2006.01)
*F24F 11/62* (2018.01)
*F24F 11/30* (2018.01)

(52) U.S. Cl.
CPC .............. *G05B 11/42* (2013.01); *F24F 11/30* (2018.01); *F24F 11/62* (2018.01)

(58) Field of Classification Search
CPC ........ G05B 11/42; G05B 11/50; G05B 13/00; F24F 11/62; F24F 11/30; G01M 99/005

See application file for complete search history.

(56) References Cited

U.S. PATENT DOCUMENTS 5,355,305 A 10/1994 Seem et al.
5,506,768 A 4/1996 Seem et al.
(Continued)

OTHER PUBLICATIONS

A. Horch, "A simple method for detection of stiction in control valves," Control Engineering Practice, vol. 7, pp. 1221-1231, 1999.
(Continued)

*Primary Examiner* — Toan M Le
(74) *Attorney, Agent, or Firm* — Foley & Lardner LLP

(57) ABSTRACT

A plant includes equipment that operate to affect a variable state or condition of the plant in response to a control signal. A feedback controller monitors a process variable received via a feedback signal from the plant and uses an error signal representing a setpoint error between the process variable and a setpoint to generate the control signal for the plant. An exponentially-weighted moving average (EWMA) calculator generates EWMA values based on the setpoint error. A normalized index generator uses the EWMA values to calculate a normalized performance index. A threshold generator generates a threshold based on a first alarm parameter κ representing a normalized magnitude of the setpoint error and a second alarm parameter η representing a normalized duration that the setpoint error has persisted. An alarm manager generates an alarm in response to the normalized performance index crossing the threshold.

20 Claims, 9 Drawing Sheets

Related U.S. Application Data continuation-in-part of application No. 14/475,288, filed on Sep. 2, 2014, now Pat. No. 9,920,943.

(56) References Cited

U.S. PATENT DOCUMENTS

| | | | |
|---|---|---|---|
| 6,937,909 | B2 | 8/2005 | Seem |
| 10,197,977 | B2 * | 2/2019 | Salsbury ............... G05B 11/42 |
| 2005/0256661 | A1 | 11/2005 | Salsbury et al. |
| 2008/0281439 | A1 | 11/2008 | Salsbury |
| 2014/0257528 | A1 | 9/2014 | Perez et al. |

OTHER PUBLICATIONS

A. Horch, et al., "A modified index for control performance assessment". Proceedings of the American Control Conference, Jun. 1998, 5 pages.

A. Horch. "Condition Monitoring of Control Loops". Ph.D. dissertation, Royal Institute of Technology, Stockholm, Sweden. 2000, 216 pages.

A. O'Dwyer, Handbook of PI and PID Controller Tuning Rules. London: Imperial College Press, 2009, 623 pages.

A. Ordys, et al., Process Control Performance Assessment: From Theory to Implementation. Springer, 2007.

B. Kedem, Time Series Analysis by Higher Order Crossings. New York: IEEE Press, 1994, 48 pages.

B.-S. Ko et al., "Pid control performance assessment: The single-loop case," A/CHE Journal, vol. 50, No. 6, pp. 1211-1218, Jun. 2004.

Final Office Action on U.S. Appl. No. 14/961,747 dated Jul. 10, 2018. 11 pages.

J. A. McFadden, "The axis-crossing interval of random functions," IRE Transactions on Information Theory, vol. IT-2, pp. 146-150, 1956, 11 pages.

L. Desborough et al., "Performance assessment measures for univariate feedback control," The Canadian Journal of Chemical Engineering, vol. 70, p. 1186, 1992.

Mohieddine Jelali, "An overview of control performance assessment technology and industrial applications." Control Eng. Practice, vol. 14, No. 5, p. 441, 2006.

T.J. Harris, "Assessment of control Loop Peformance". Canadian Journal of Chemical Engineering. vol. 67, pp. 856. 1989.

U.S. Office Action on U.S. Appl. No. 14/475,288 dated Jun. 1, 2017. 7 pages.

U.S. Office Action on U.S. Appl. No. 14/961,747 dated Jan. 18, 2018. 20 pages.

* cited by examiner

FEEDBACK CONTROL SYSTEM WITH NORMALIZED PERFORMANCE INDICES FOR SETPOINT ALARMING

CROSS-REFERENCE TO RELATED PATENT APPLICATION

This application is a continuation of U.S. patent application Ser. No. 14/961,747 filed Dec. 7, 2015, which is a continuation-in-part of U.S. patent application Ser. No. 14/475,288 filed Sep. 2, 2014. Both of these patent applications are incorporated by reference herein in their entireties.

BACKGROUND

The present invention relates generally to feedback controllers and more particularly to systems and methods for calculating performance indices for feedback controllers. The present invention may be implemented in a building heating, ventilation, and air conditioning (HVAC) system to monitor and quantify the performance of the HVAC system.

Feedback controllers are used to control a wide variety of systems and processes. In a building HVAC system, feedback controllers are used to control HVAC devices (e.g., valves, pumps, dampers, fans, chillers, air-handling units, etc.) in a way that maintains a controlled variable (e.g., temperature, humidity, flow rate, pressure, etc.) at a desired setpoint. Feedback controllers generally use control parameters such as a proportional gain, an integral term, and/or a derivative term. The control parameters may be applied to an error signal (e.g., a difference between a setpoint and a feedback signal) to calculate an input that is provided to the controlled system or process.

The performance of a control system depends significantly on the performance of the controller. Various methods have been used to quantify the performance of feedback controllers. However, many traditional performance measures (e.g., mean absolute error) have expected values that depend on the system under control, as well as the size and frequency of unmeasured disturbances. Such performance measures are difficult to evaluate and cannot be directly compared across systems or controllers. Other performance measures use an idealized benchmark (e.g., minimum variance) to generate normalized performance indices. However, traditional methods for calculating normalized index values are computationally expensive and the use of such methods has generally been limited to analyzing data offline in batch.

SUMMARY

One implementation of the present disclosure is a feedback control system. The feedback control system includes a plant having equipment operable to affect a variable state or condition of the plant in response to a control signal. The feedback control system includes a feedback controller configured to monitor a process variable received via a feedback signal from the plant and use an error signal representing a setpoint error between the process variable and a setpoint to generate the control signal for the plant. The feedback control system includes an exponentially-weighted moving average (EWMA) calculator configured to generate EWMA values based on the setpoint error as new values of the process variable are received and a normalized index generator configured to use the EWMA values to calculate a normalized performance index. The feedback control system includes a threshold generator configured to generate a threshold based on a first alarm parameter κ representing a normalized magnitude of the setpoint error and a second alarm parameter η representing a normalized duration that the setpoint error has persisted. The feedback control system includes an alarm manager configured to generate an alarm in response to the normalized performance index crossing the threshold.

In some embodiments, the threshold is control loop agnostic and does not depend on any variables or parameters that are specific to the feedback control system.

In some embodiments, the threshold represents an expected value of the normalized performance index when the setpoint error exceeds a predetermined magnitude and has persisted for a predetermined duration.

In some embodiments, the predetermined magnitude is specified as a multiple of a standard deviation of the error signal without requiring knowledge of the standard deviation and the predetermined duration is specified as a multiple of a time constant of the EWMA values without requiring knowledge of the time constant.

In some embodiments, the first alarm parameter κ is a ratio of a magnitude of the setpoint error to a standard deviation of the error signal and the second alarm parameter η is a ratio of a duration for which the setpoint error has persisted to a time constant of the EWMA values.

In some embodiments, the threshold generator is configured to use predetermined values for the alarm parameters κ and η to generate the threshold without requiring knowledge of any variables or parameters that are specific to the feedback control system.

In some embodiments, the feedback control system includes an expected value estimator configured to estimate a value of the normalized performance index expected to occur when a setpoint error of a predetermined magnitude has persisted for a predetermined duration. In some embodiments, the threshold is based on the expected value of the normalized performance index.

In some embodiments, the feedback control system includes an error calculator configured to receive the process variable from the plant and compare the process variable with the setpoint to generate the error signal.

Another implementation of the present disclosure is a method for using a normalized performance index for setpoint alarming in a feedback control system. The method includes operating equipment of a plant to affect a variable state or condition of the plant in response to a control signal, monitoring a process variable received via a feedback signal from the plant, and using an error signal representing a setpoint error between the process variable and a setpoint to generate the control signal for the plant. The method includes generating exponentially-weighted moving average (EWMA) values based on the setpoint error as new values of the process variable are received and calculating a normalized performance index based on the EWMA values. The method includes generating a threshold based on a first alarm parameter κ representing a normalized magnitude of the setpoint error and a second alarm parameter η representing a normalized duration that the setpoint error has persisted. The method includes generating an alarm in response to the normalized performance index crossing the threshold.

In some embodiments, the threshold is control loop agnostic and does not depend on any variables or parameters that are specific to the feedback control system.

In some embodiments, the threshold represents an expected value of the normalized performance index when the setpoint error exceeds a predetermined magnitude and has persisted for a predetermined duration.

In some embodiments, the predetermined magnitude is specified as a multiple of a standard deviation of the error signal without requiring knowledge of the standard deviation and the predetermined duration is specified as a multiple of a time constant of the EWMA values without requiring knowledge of the time constant.

In some embodiments, the first alarm parameter κ is a ratio of a magnitude of the setpoint error to a standard deviation of the error signal and the second alarm parameter η is a ratio of a duration for which the setpoint error has persisted to a time constant of the EWMA values.

In some embodiments, generating the threshold includes using predetermined values for the alarm parameters κ and η without requiring knowledge of any variables or parameters that are specific to the feedback control system.

In some embodiments, the method includes estimating a value of the normalized performance index expected to occur when a setpoint error of a predetermined magnitude has persisted for a predetermined duration. In some embodiments, the threshold is based on the expected value of the normalized performance index.

In some embodiments, the method includes receiving the process variable from the plant and comparing the process variable with the setpoint to generate the error signal.

Another implementation of the present disclosure is one or more non-transitory computer-readable media containing program instructions. When executed by one or more processors, the instructions cause the one or more processors to perform operations including operating equipment of a plant to affect a variable state or condition of the plant in response to a control signal, monitoring a process variable received via a feedback signal from the plant, using an error signal representing a setpoint error between the process variable and a setpoint to generate the control signal for the plant, generating exponentially-weighted moving average (EWMA) values based on the setpoint error as new values of the process variable are received, calculating a normalized performance index based on the EWMA values, generating a threshold based on a first alarm parameter κ representing a normalized magnitude of the setpoint error and a second alarm parameter η representing a normalized duration that the setpoint error has persisted, and generating an alarm in response to the normalized performance index crossing the threshold.

In some embodiments, the normalized performance index is control loop agnostic and does not depend on any variables or parameters that are specific to the plant.

In some embodiments, the normalized magnitude is specified as a multiple of a standard deviation of the error signal without requiring knowledge of the standard deviation and the normalized duration is specified as a multiple of a time constant of the error signal without requiring knowledge of the time constant.

In some embodiments, the first alarm parameter κ is a ratio of a magnitude of the setpoint error to a standard deviation of the error signal and the second alarm parameter η is a ratio of a duration for which the setpoint error has persisted to a time constant of the error signal.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Overview

Figure 1:
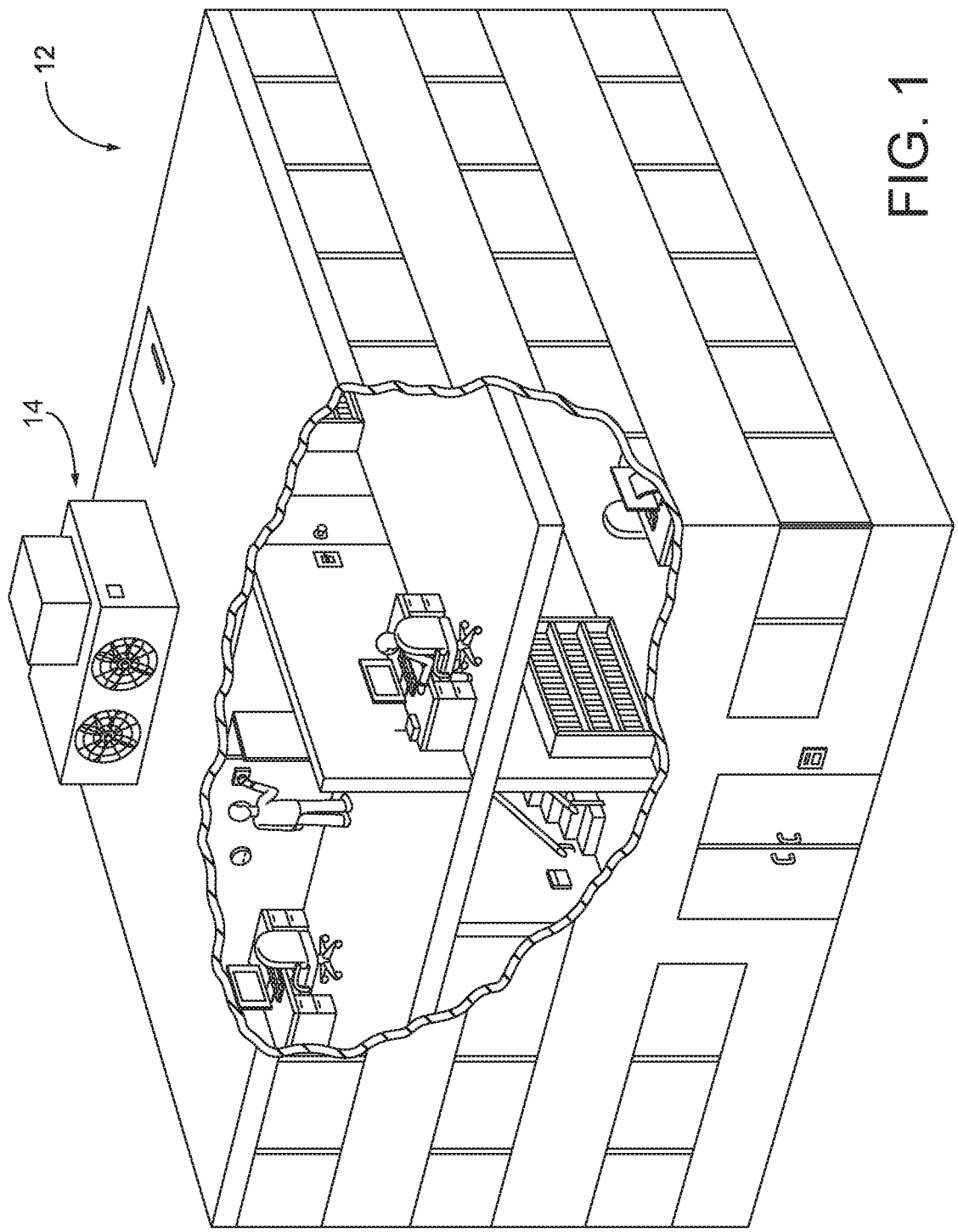
FIG. 1 is drawing of a building in which the systems and methods of the present disclosure may be implemented, according to an exemplary embodiment.

Referring generally to the FIGURES, systems and methods for using normalized performance indices for setpoint alarming are shown, according to an exemplary embodiment. The systems and methods described herein may be implemented in a building heating, ventilation, and air conditioning (HVAC) system to monitor the performance of the HVAC system and generate alarms when a persistent setpoint error occurs.

Advantageously, the systems and methods of the present disclosure use exponentially-weighted moving average (EWMA) statistics to generate the normalized performance indices. The advantage of using EWMAs is that such statistics are relatively easy to calculate (i.e., computationally inexpensive) and can be generated recursively by a feedback controller without requiring the storage of batch data or offline operation. Each EWMA operates on the error signal (e) in the control loop, which may be defined as the difference between the setpoint (r) and the controlled variable (y) (i.e., $e_k = r_k - y_k$, where k is the sample number). Three different EWMA statistics may be calculated as described below.

The first EWMA (i.e., $ewma_{1,k}$) may be calculated using unmodified error signal samples according to the following equation:

$$ewma_{1,k} = ewma_{1,k-1} + \frac{e_k - ewma_{1,k-1}}{\min(k, W)}$$

where $ewma_{1,k-1}$ is the value of the first EWMA statistic at the previous time step (k−1), $e_k$ is the value of the error signal at the current time step (k), and W is the effective number of samples used in the weighted averages. The use of the minimum in the denominator of the update term causes the statistic to begin as a straight average until the number of samples reaches the window size, at which point the statistic becomes exponentially-weighted.

The second EWMA (i.e., $ewma_{2,k}$) may be calculated using the absolute value of the error signal according to the following equation:

$$ewma_{2,k} = ewma_{2,k-1} + \frac{|e_k| - ewma_{2,k-1}}{\min(k, W)}$$

where $ewma_{2,k-1}$ is the value of the second EWMA statistic at the previous time step k−1 and $|e_k|$ is the absolute value of the error signal at the current time step k.

The third EWMA (i.e., $ewma_{3,k}$) may be calculated using a time-differenced error signal that is modified by a parameter ($\alpha$) according to the following equation:

$$ewma_{3,k} = ewma_{3,k-1} + \frac{|e_k - \alpha e_{k-1}| - ewma_{3,k-1}}{\min(k, W)}$$

where $ewma_{3,k-1}$ is the value of the third EWMA statistic at the previous time step k−1, $e_{k-1}$ is the value of the error signal at the previous time step k−1, and $\alpha$ is a parameter derived from a specified time constant for the closed-loop system. The error signal $e_k$ may be calculated as new data is received (e.g., $e_k = r_k - y_k$) and used to iteratively update the EWMA statistics.

The parameter $\alpha$ may be determined using the equation:

$$\alpha = e^{-\Delta T/\tau_s}$$

where $\Delta T$ is the sample period and $\tau_s$ is the specified time constant. The specified time constant $\tau_s$ represents a target value for the closed-loop time constant of the controlled system. The specified time constant $\tau_s$ may be estimated and/or set to a value equal to the integral time parameter $T_i$ of the controller. In some embodiments, the sample period $\Delta T$ is between one-tenth and one-thirtieth of the specified closed-loop time constant $$\left(\text{i.e., } \frac{\tau_s}{30} \leq \Delta T \leq \frac{\tau_s}{10}\right).$$

The EWMA statistics may be used to calculate a first normalized performance index ($I_1$) using the equation:

$$I_1 = 1 - \frac{|ewma_1|}{ewma_2}$$

and a second normalized performance index ($I_2$) using the equation:

$$I_2 = \frac{[ewma_3]^2}{(1-\alpha^2)[ewma_2]^2}$$

The first index $I_1$ is designed to detect problems in a control loop (e.g., a failure to track a setpoint) and is based on an evaluation of symmetry of the process variable y around setpoint r. For example, values of $I_1$ near zero indicate poor setpoint tracking, whereas values of $I_1$ near one indicate good setpoint tracking. The second index $I_2$ considers tracking performance in terms of an expectation based on controller tuning and process type. Advantageously, both indices are normalized to allow different control loops to be compared on the same scale.

A setpoint alarming system may determine an expected value for the normalized performance index $I_1$ that results from a setpoint error of a given magnitude and duration. An exemplary process for determining the expected value of the performance index $I_1$ for a given setpoint error is described in greater detail below. The system may use the expected value as a threshold $I_{threshold}$ for setpoint alarming. For example, the system may compare the actual value of the normalized performance index $I_1$ to the threshold value $I_{threshold}$ and generate a setpoint tracking alarm when the actual value of $I_1$ is less than the threshold $I_{threshold}$.

Advantageously, both the magnitude and duration of the setpoint error used to calculate the threshold $I_{threshold}$ may be specified as normalized parameters that are control loop agnostic. In other words, the magnitude and duration of the setpoint error used to calculate $I_{threshold}$ do not depend on any parameters or values specific to a particular control loop. For example, the magnitude of the setpoint error used to calculate the threshold $I_{threshold}$ may be specified as a multiple $\kappa$ of the standard deviation $\sigma$ of the error signal as shown in the following equation:

$$\kappa = \frac{\epsilon}{\sigma}$$

where $\epsilon$ is the magnitude of the setpoint error and $\sigma$ is the standard deviation of the error signal under normal control. Similarly, the duration of the setpoint error used to calculate the threshold $I_{threshold}$ may be specified as a multiple $\eta$ of the EWMA time constant $\tau$ as shown in the following equation:

$$\eta = \frac{t}{\tau}$$

where t is the time that the setpoint error persists and $\tau$ is the EWMA time constant.

The setpoint alarming system may use the control loop agnostic parameters $\kappa$ and $\eta$ to generate the threshold $I_{threshold}$ for the normalized index value $I_1$ (i.e., $I_1 = f(\kappa, \eta)$). This results in a threshold $I_{threshold}$ that is also control loop agnostic and can be applied to any control loop. For example, specifying the values $\kappa=4$ and $\eta=5$ may cause the system to generate a threshold $I_{threshold}$ that represents the expected value of the normalized performance index $I_1$ when the setpoint error is 4 times the standard deviation σ of the error signal and persists for 5 times as long as the EWMA time constant τ, regardless of the values of σ and τ. Accordingly, it is not necessary to determine the values of either the standard deviation σ of the error signal or the EWMA time constant τ to calculate the threshold $I_{threshold}$. This allows the same value of the threshold $I_{threshold}$ to be used for setpoint alarming in multiple different control loops. Exemplary systems and methods for generating and using the threshold $I_{threshold}$ for setpoint alarming are described in greater detail below.

Building and HVAC System

Referring now to FIG. 1, a perspective view of a building 12 in which the systems and methods of the present disclosure may be implemented is shown, according to an exemplary embodiment. Building 12 may include any number of floors, rooms, spaces, zones, and/or other building structures or areas, including an outdoor area. The systems, devices, control modules, and methods of the present disclosure may be implemented in building 12 and/or building systems serving building 12 (e.g., a rooftop air handing unit 14, a controller thereof, a control loop for adjusting the amount of ventilation provided to a building space, etc.).

Figure 2:
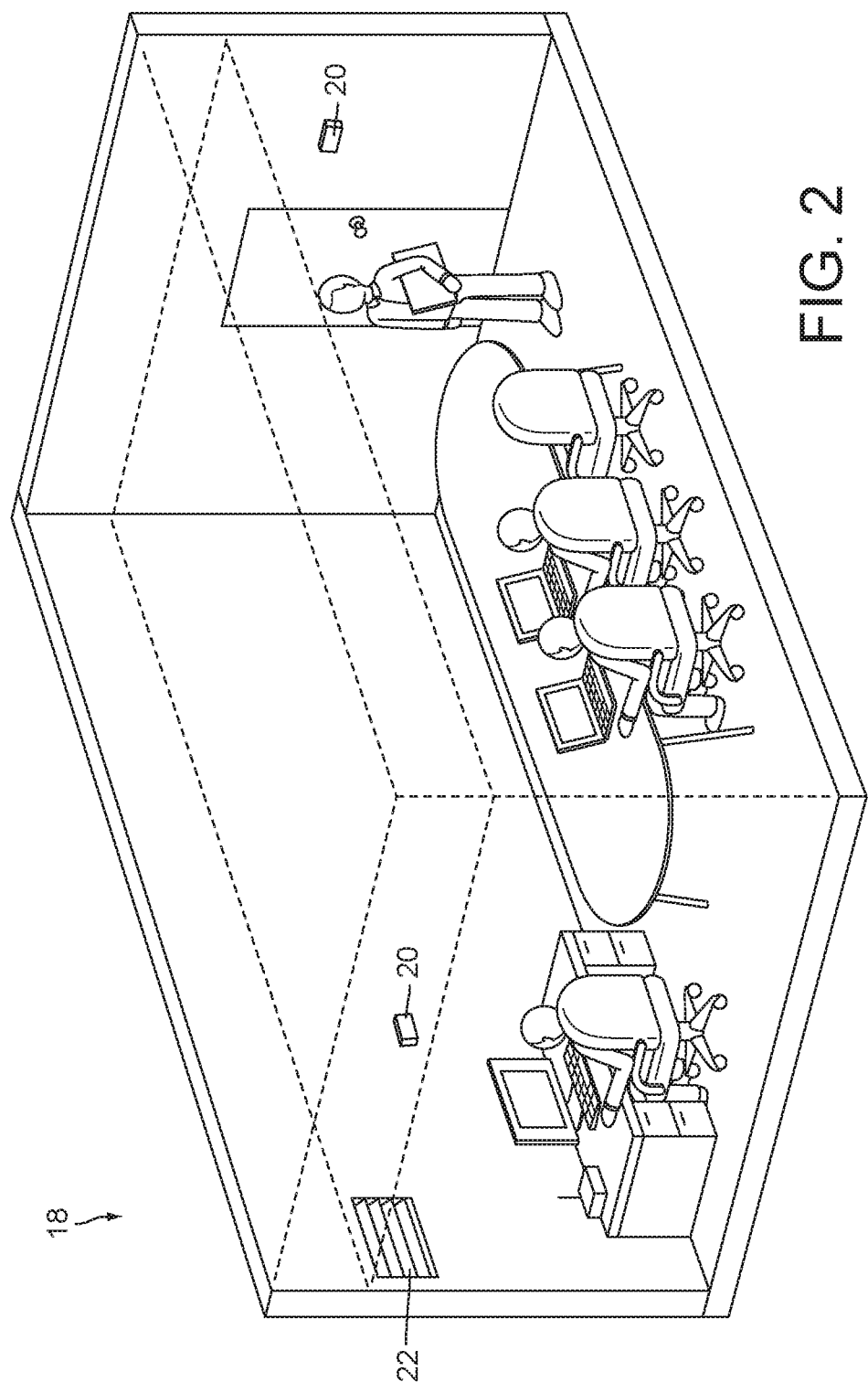
FIG. 2 is a drawing illustrating a zone of the building of FIG. 1 in greater detail and showing a HVAC system servicing the building zone, according to an exemplary embodiment.

Referring now to FIG. 2, a building zone 18 of building 12 is shown in greater detail, according to an exemplary embodiment. Building zone 18 includes a heating, ventilation, and air conditioning (HVAC) vent 22 coupled to ductwork. Supply air flow or ventilation is provided to zone 18 via vent 22. A variable air volume (VAV) box may be used to control the airflow into building zone 18 via a damper located in vent 22. Sensors 20 disposed within and/or around building zone 18 and may be configured to sense conditions within building zone 18. Sensors 20 may be temperature sensors, humidity sensors, air quality sensors, or any other type of sensor configured to sense a building-related condition. In various embodiments, sensors 20 may be located on the walls of building zone 18 (as shown in FIG. 2) or elsewhere within or around building zone 18. Sensors 20 can be wireless or wired sensors configured to operate on or with any network topology.

While the systems and methods of the present disclosure are described with reference to a building HVAC system, it is understood that any process system or plant (e.g., mechanical equipment used to affect a controlled variable) and/or any control loop thereof may be modified to include the systems and methods described herein. The systems and methods described herein may be incorporated into an existing feedback controller (e.g., a proportional-integral (PI) controller, a proportional-integral-derivative (PID) controller, a pattern recognition adaptive controller (PRAC), etc.), a new feedback controller, and may supplement a new or existing feedback control system.

Feedback Control System

Figure 3:
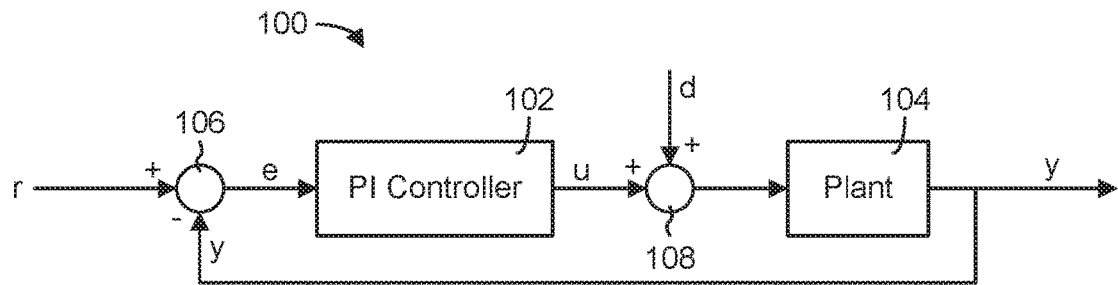
FIG. 3 is a block diagram of a closed-loop control system that may be used to control a variable state or condition of the building zone of FIG. 2, according to an exemplary embodiment.

Referring now to FIG. 3, a block diagram of a closed-loop control system 100 is shown, according to an exemplary embodiment. System 100 may be a building management system or part of a building management system (e.g., a HVAC control system, a lighting control system, a power control system, a security system, etc.). System 100 may be a local or distributed control system used to control a single building (e.g., building 12), a system of buildings, or one or more zones within a building (e.g., building zone 18). In some implementations, system 100 may be a METASYS® brand control system as sold by Johnson Controls, Inc.

System 100 is shown to include a PI controller 102, a plant 104, a subtractor element 106, and a summation element 108.

Plant 104 may be a system or process monitored and controlled by closed-loop system 100 (e.g., a control process). Plant 104 may be a dynamic system (e.g., a building, a system of buildings, a zone within a building, etc.) including one or more variable input devices (e.g., dampers, air handling units, chillers, boilers, actuators, motors, etc.) and one or more measurement devices (e.g., temperature sensors, pressure sensors, voltage sensors, flow rate sensors, humidity sensors, etc.). In some implementations, plant 104 may be a zone within a building (e.g., a room, a floor, an area, building zone 18, etc.) and control system 100 may be used to control temperature within the zone. For example, control system 100 may actively adjust a damper position in a HVAC unit (e.g., an air handling unit (AHU), a variable air volume (VAV) box, etc.) for increasing or decreasing the flow of conditioned air (e.g., heated, chilled, humidified, etc.) into the building zone.

Plant 104 may receive an input from summation element 108 which combines a control signal u with a disturbance signal d. In some embodiments, plant 104 may be modeled as a first-order plant having a transfer function $$G_p(s) = \frac{K_P}{1+\tau_p s} e^{-Ls},$$

where $\tau_p$ is the dominant time constant, L is the time delay, and $K_p$ is the process gain. In other embodiments, plant 104 may be modeled as a second-order, third-order, or higher order plant. Plant 104 may produce a feedback signal y in response to control signal u and disturbance signal d. Feedback signal y may be subtracted from setpoint r at subtractor element 106 to produce an error signal e (e.g., =r−y).

PI controller 102 is shown receiving error signal e from subtractor element 106. PI controller 102 may produce a control signal u in response to the error signal e. In some embodiments, controller 102 is a proportional-integral controller. PI controller 102 may have a transfer function $$G_c(s) = \frac{K_c(1+T_i s)}{T_i s},$$

where $K_c$ is the controller gain and $T_i$ is the integral time. Controller gain $K_c$ and integral time $T_i$ are the control parameters which define the response of PI controller 102 to error signal e. That is, controller gain $K_c$ and integral time $T_i$ control how PI controller 102 translates error signal e into control signal u. In some embodiments, $K_c$ and $T_i$ are the only control parameters. In other embodiments, different control parameters (e.g., a derivative control parameter, etc.) may be used in addition to or in place of control parameters $K_c$ and $T_i$.

Figure 4:
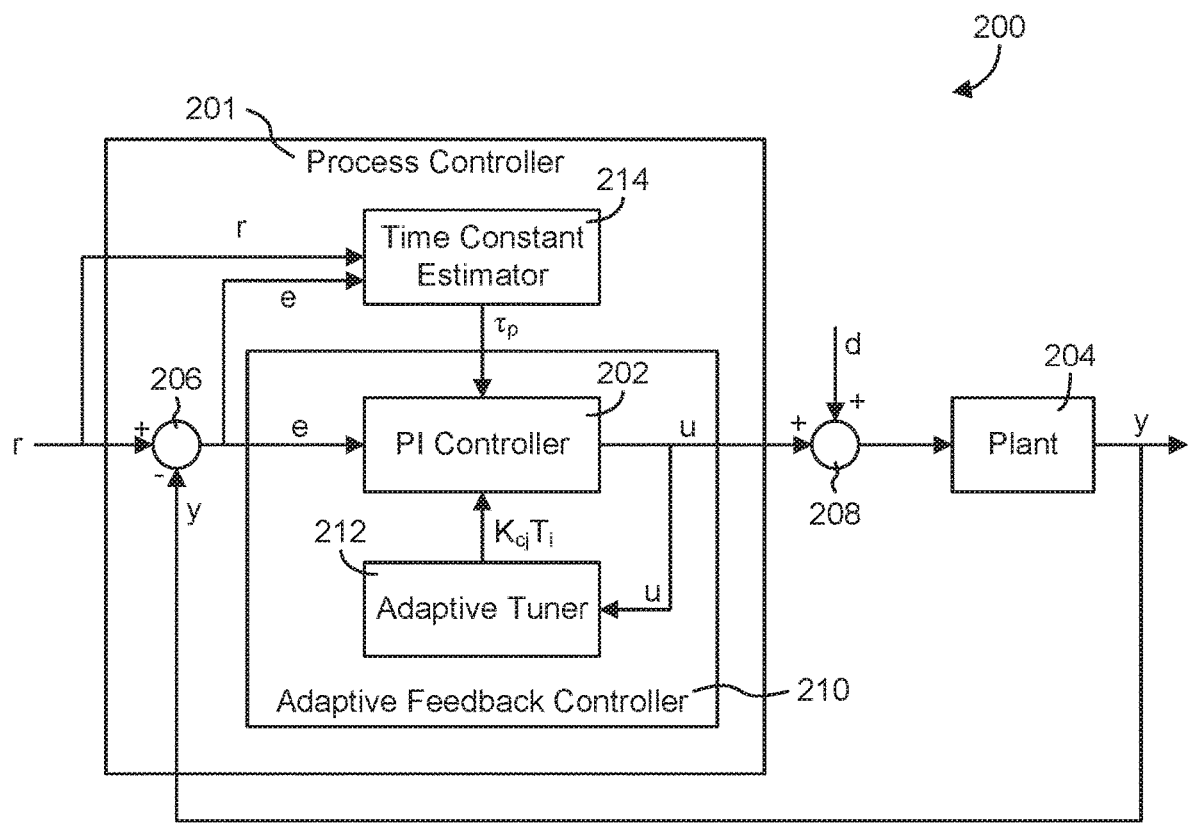
FIG. 4 is a block diagram illustrating the closed-loop control system of FIG. 3 in greater detail and showing a process controller that may be used to control the building zone using a feedback control strategy and to generate normalized performance indices for the closed-loop system, according to an exemplary embodiment.

Referring now to FIG. 4, a block diagram of a closed-loop system 200 is shown, according to an exemplary embodiment. System 200 is shown to include a process controller 201 having an adaptive feedback controller 210 and a time constant estimator 214. Adaptive feedback controller 210 may be a pattern recognition adaptive controller (PRAC), a model recognition adaptive controller (MRAC), a model predictive controller (MPC) or any other type of adaptive tuning or feedback controller. Several exemplary controllers that may be used, in some embodiments, as adaptive feedback controller 210 are described in detail in U.S. Pat. Nos. 5,355,305, 5,506,768, and 6,937,909, each of which is incorporated by reference herein.

Adaptive feedback controller 210 may include a proportional-integral (PI) controller, a proportional-derivative (PD) controller, a proportional-integral-derivative (PID) controller, or any other type of controller that generates a control signal in response to a feedback signal, an error signal, and/or a setpoint. Adaptive feedback controller 210 may be any type of feedback controller (e.g., PRAC, MRAC, PI, etc.) that adaptively adjusts one or more controller parameters (e.g., a proportional gain, an integral time, etc.) used to generate the control signal. Adaptive feedback controller 210 is shown to include a PI controller 202 and an adaptive tuner 212.

PI controller 202 may be the same or similar to PI controller 102, described with reference to FIG. 3. For example, PI controller 202 may be a proportional-integral controller having a transfer function $$G_c(s) = \frac{K_c(1 + T_i s)}{T_i s}.$$

PI controller 202 may receive an error signal e from subtractor element 206 and provide a control signal u to summation element 208. Summation element 208 may combine control signal u with a disturbance signal d and provide the combined signal to plant 204. Elements 206, 208, and plant 204 may be the same or similar to elements 106, 108, and plant 104 as described in reference to FIG. 1.

Adaptive tuner 212 may periodically adjust (e.g., calibrate, tune, update, etc.) the control parameters used by PI controller 202 in translating error signal e into control signal u. The control parameters determined by adaptive tuner 212 may include a controller gain $K_c$ and an integral time $T_i$. Adaptive tuner 212 may receive control signal u from PI controller 202 and adaptively determine control parameters $K_c$ and $T_i$ based on control signal u (e.g., as described in the aforementioned U.S. Patents). Adaptive tuner 212 provides the control parameters $K_c$ and $T_i$ to PI controller 202.

Still referring to FIG. 4, system 200 is further shown to include a time constant estimator 214. Time constant estimator 214 may be configured to determine or estimate a dominant time constant $\tau_p$ for plant 204. Time constant $\tau_p$ may be used to predict the response of plant 204 to a given control signal u. In some embodiments, time constant $\tau_p$ may be used to calculate the parameter $\alpha$, which is used to calculate $ewma_{3,k}$ as described above.

Time constant estimator 214 is shown receiving setpoint r as well as error signal e. In other embodiments, time constant estimator 214 may receive only error signal e or may calculate error signal e based on setpoint r and feedback signal y (e.g., e=r−y). Time constant estimator 214 may determine the dominant time constant $\tau_p$ based on error signal e, setpoint r, and/or other inputs received from various components of control system 200. In some embodiments, time constant estimator 214 may estimate a time constant based on control signal u (e.g., in a feed forward, model predictive control, and/or open loop control system). In some embodiments, control signal u may be used in place of or in addition to error signal e in estimating a time constant.

The process used to estimate time constant $\tau_p$ may depend on whether system 200 is subject to a setpoint change or a load disturbance. A setpoint change is an increase or decrease in setpoint r. A setpoint change may be instantaneous (e.g., a sudden change from a first setpoint value to a second setpoint value) or gradual (e.g., a ramp increase or decrease, etc.). A setpoint change may be initiated by a user (e.g., adjusting a temperature setting on a thermostat) or received from another controller or process (e.g., a supervisory controller, an outer loop cascaded controller, etc.).

If system 200 is subject to a setpoint change, time constant estimator 214 may estimate time constant $\tau_p$ by integrating the error signal e (e.g., numerically, analytically, etc.) to determine an area A under the error curve. Time constant estimator 214 may then divide the area A under the error curve by a magnitude of the setpoint change $\alpha$ to determine the estimated time constant $\tau_p$ $$\left(\text{e.g., } \tau_p = \frac{A}{a}\right).$$

A load disturbance is an uncontrolled input applied to plant 204. For example, in a temperature control system for a building, the load disturbance may include heat transferred through the external walls of the building or through an open door (e.g., during a particularly hot or cold day). The load disturbance may be measured or unmeasured. In some embodiments, time constant estimator 214 receives a signal (e.g., a status indicator, a process output, etc.) from adaptive feedback controller 210 indicating whether system 200 is subject to a setpoint change or a load disturbance. In other embodiments, time constant estimator 214 determines whether a setpoint change or load disturbance has occurred by analyzing the error signal e and/or setpoint r.

If system 200 is subject to a load disturbance, time constant estimator 214 may estimate the time constant $\tau_p$ by determining a time $t_{ex}$ at which the error signal e reaches an extremum (e.g., a minimum or a maximum) in response to the load disturbance. Time constant estimator 214 may subtract a time at which the load disturbance begins $t_d$ from the time at which error signal e reaches an extremum $t_{ex}$ in response to the load disturbance to determine the estimated time constant $\tau_p$ (e.g., $\tau_p = t_{ex} - t_d$). Systems and methods for estimating a time constant are described in greater detail in U.S. patent application Ser. No. 13/794,683, filed Mar. 11, 2013, the entirety of which is incorporated by reference herein.

Process Controller

Figure 5:
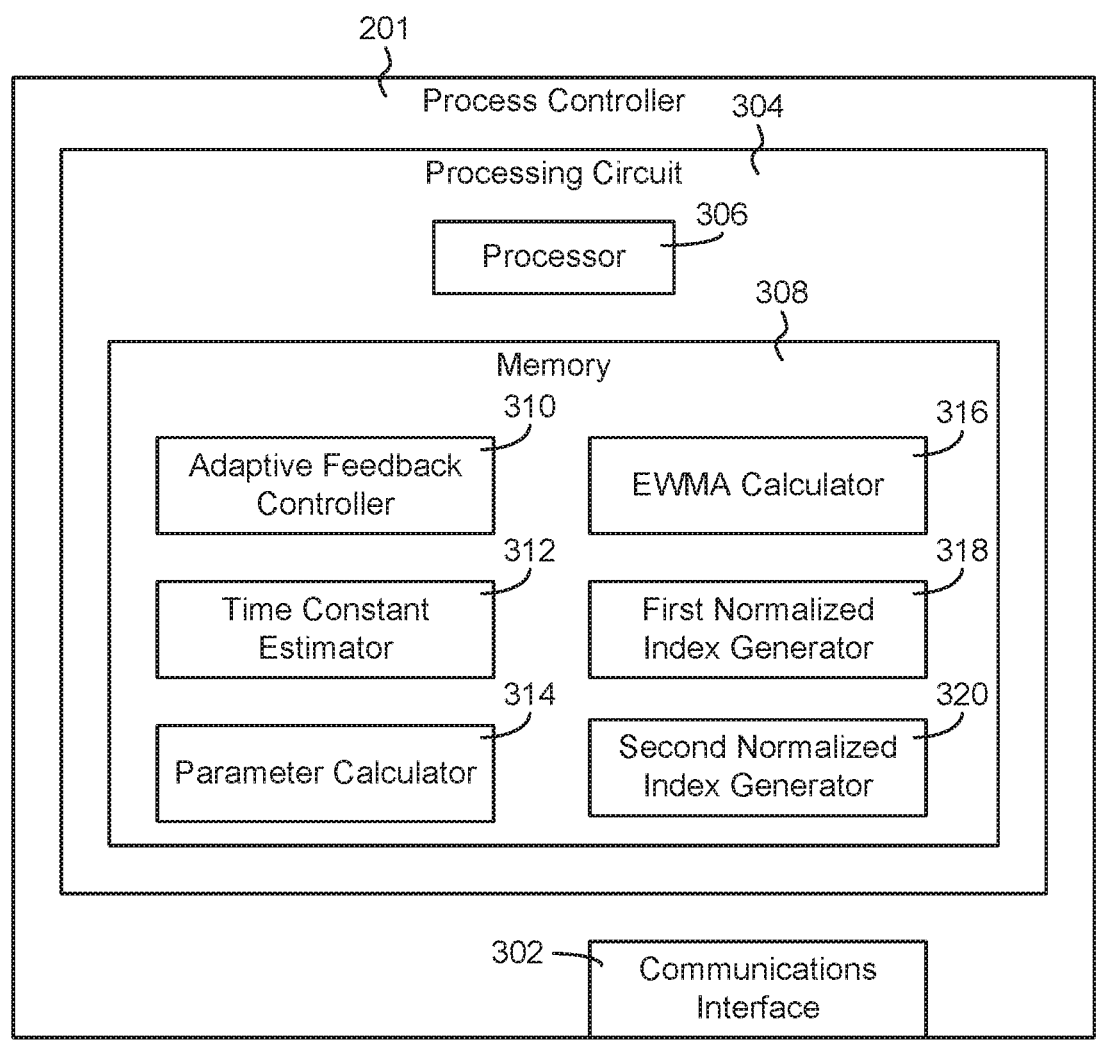
FIG. 5 is a block diagram illustrating process controller of FIG. 4 in greater detail and showing various components configured to calculate EWMA statistics and to generate the normalized performance indices using the EWMA statistics, according to an exemplary embodiment.

Referring now to FIG. 5, a block diagram illustrating process controller 201 in greater detail is shown, according to an exemplary embodiment. Process controller 201 may be configured to calculate various EWMA statistics based on the error signal $e_k$. Process controller 201 may calculate a first EWMA statistic using unmodified error signal samples (e.g., $ewma_{1,k}=f(e_k)$), a second EWMA statistic using an absolute value of the error signal (e.g., $ewma_{2,k}=f(|e_k|)$), and a third EWMA statistic using a time-differenced error signal modified by a parameter $\alpha$ (e.g., $ewma_{3,k}=f(e_k-\alpha e_{k-1})$). In some embodiments, process controller 201 estimates a dominant closed-loop time constant $\tau_s$ and uses the estimated time constant to calculate the parameter $\alpha$.

Process controller 201 may use the EWMA statistics to calculate a first normalized performance index $I_1$ and a second normalized performance index $I_2$. The first index is designed to detect severe problems in a control loop (e.g., a failure to track a setpoint) and is based on an evaluation of symmetry of the process variable y around setpoint r. The second index considers tracking performance in terms of an expectation based on controller tuning and process type.

Advantageously, both indices are normalized to allow different control loops to be compared on the same scale.

Process controller 201 is shown to include a communications interface 302 and a processing circuit 304. Communications interface 302 may include any number of jacks, wire terminals, wire ports, wireless antennas, or other communications adapters, hardware, or devices for communicating information (e.g., setpoint r information, error signal e information, feedback signal y information, etc.) or control signals (e.g., a control signal u, etc.). Communications interface 302 may be configured to send or receive information and/or control signals between process controller 201 and a controlled system or process (e.g., plant 204), between process controller 201 and a supervisory controller, or between process controller 201 and a local controller (e.g., a device, building, or network specific controller). Communications interface 302 may send or receive information over a local area network (LAN), wide area network (WAN), and/or a distributed network such as the Internet. Communications interface 302 may include various types of communications electronics (e.g., receivers, transmitters, transceivers, modulators, demodulators, filters, communications processors, communication logic modules, buffers, decoders, encoders, encryptors, amplifiers, etc.) configured to provide or facilitate the communication of the signals described herein.

Processing circuit 304 is shown to include a processor 306 and memory 308. Processor 306 can be implemented as a general purpose processor, an application specific integrated circuit (ASIC), one or more field programmable gate arrays (FPGAs), a group of processing components, or other suitable electronic processing components.

Memory 308 (e.g., memory device, memory unit, storage device, etc.) may include one or more devices (e.g., RAM, ROM, Flash memory, hard disk storage, etc.) for storing data and/or computer code for completing or facilitating the various processes, layers and modules described in the present disclosure. Memory 308 may be or include volatile memory or non-volatile memory. Memory 308 may include database components, object code components, script components, or any other type of information structure for supporting the various activities and information structures described in the present application. According to an exemplary embodiment, memory 308 is communicably connected to processor 306 via processing circuit 304 and includes computer code for executing (e.g., by processing circuit 304 and/or processor 306) one or more processes described herein.

Still referring to FIG. 5, memory 308 is shown to include an adaptive feedback controller 310. Adaptive feedback controller 310 may be configured to perform the functions of PI controller 202 and adaptive tuner 212, as described with reference to FIG. 4. Adaptive feedback controller 310 may include the functionality of a pattern recognition adaptive controller (PRAC), a model recognition adaptive controller (MRAC), or any other type of adaptive tuning or feedback controller. Adaptive feedback controller 310 may receive an error signal e representing a difference between a feedback signal y and a setpoint r. Adaptive feedback controller 310 may calculate a control signal u for a controlled process or system based on the error signal e. The control signal u may be communicated to the controlled process or system via communications interface 302.

Memory 308 is shown to include a time constant estimator 312. Time constant estimator 312 may be configured to perform the functions of time constant estimator 214, as described with reference to FIG. 4. Time constant estimator 312 may receive an error signal e, a setpoint r, and/or a feedback signal y. Time constant estimator 312 may be configured to monitor the error signal e and estimate a time constant $\tau_p$ for a controlled system or process based on the error signal e.

In some implementations, time constant estimator 312 determines whether the controlled system is to a setpoint change or a load disturbance (e.g., by receiving a signal from adaptive feedback controller 310, by analyzing the error signal e, etc.). If the system is subject to a setpoint change, time constant estimator 312 may estimate the time constant $\tau_p$ by determining an area A under the error curve (e.g., defined by error signal e). The area under the error curve may be divided by the magnitude a of the setpoint change to determine the estimated time constant $\tau_p$.

If the system is subject to a load disturbance, time constant estimator 312 may estimate the time constant $\tau_p$ by determining a time at which the error signal e reaches an extremum (e.g., a minimum or a maximum) in response to the load disturbance. Time constant estimator 312 may subtract the time value at which the load disturbance begins from the time value at which the error signal e reaches an extremum to determine the estimated time constant $\tau_p$. Time constant estimator 312 may monitor the error signal e for zero crossings (e.g., a sign change from positive to negative or negative to positive) to determine the time at which a load disturbance begins.

Still referring to FIG. 5, memory 308 is shown to include a parameter calculator 314. Parameter calculator 314 may be configured to calculate the parameter $\alpha$ used to generate the third EWMA statistic $ewma_{3,k}$. In some embodiments, parameter calculator 314 calculates the parameter $\alpha$ using the following equation:

$$\alpha = e^{-\Delta T/\tau_s}$$

where $\Delta T$ is the sample period and $\tau_s$ is the specified closed-loop time constant. In some embodiments, the sample period $\Delta T$ is between one-tenth and one-thirtieth of the specified closed-loop time constant $$\left(\text{i.e., } \frac{\tau_s}{30} \le \Delta T \le \frac{\tau_s}{10}\right).$$

In some embodiments, parameter calculator 314 uses the time constant $\tau_p$ estimated by time constant estimator 312 as the specified closed-loop time constant $\tau_s$. In other embodiments, parameter calculator 314 calculates the specified time constant $\tau_s$ based on the integral time parameter $T_i$. For example, parameter calculator 314 may set the specified time constant equal to the integral time parameter (i.e., $\tau_s = T_i$). The rationale for setting the specified time constant $\tau_s$ equal to the integral time parameter is that many practical systems will have all negative real poles in their transfer functions with a dominant time constant and a set of smaller time constants with a possible time delay. These types of systems are often modeled as first-order plus time delay (FOPTD) and most PI tuning rules will yield an integral time that is similar in magnitude to the dominant plant time constant. Furthermore, a general design goal for these running rules is that the closed-loop system (i.e., the plant and the controller) should have a dominant time constant that is smaller than that of the open loop plant. Therefore, if the integral time parameter $T_i$ is a proxy for the open loop dominant time constant, then the integral time $T_i$ can be compared against the closed-loop time constant to assess system performance.

Still referring to FIG. 5, memory 308 is shown to include an EWMA calculator 316. EWMA calculator 316 may be configured to calculate EWMA statistics using the error signal $e_k$. In some embodiments, EWMA calculator 316 calculates three different EWMA statistics. EWMA calculator 316 may calculate a first EWMA (i.e., $ewma_{1,k}$) of unmodified error signal samples using the following equation:

$$ewma_{1,k} = ewma_{1,k-1} + \frac{e_k - ewma_{1,k-1}}{\min(k, W)}$$

where $ewma_{1,k-1}$ is the value of the first EWMA statistic at the previous time step (k−1), $e_k$ is the value of the error signal at the current time step k, and W is the effective number of samples used in the weighted averages. The use of the minimum in the denominator of the update term causes the EWMA statistic to begin as a straight average until the number of samples reaches the window size, at which point the statistic becomes exponentially-weighted.

EWMA calculator 316 may calculate a second EWMA (i.e., $ewma_{2,k}$) of the absolute value of the error signal using the following equation:

$$ewma_{2,k} = ewma_{2,k-1} + \frac{|e_k| - ewma_{2,k-1}}{\min(k, W)}$$

where $ewma_{2,k-1}$ is the value of the second EWMA statistic at the previous time step k−1 and $|e_k|$ is the absolute value of the error signal at the current time step k.

EWMA calculator 316 may calculate a third EWMA (i.e., $ewma_{3,k}$) of a time-differenced error signal modified by the parameter α using the following equation:

$$ewma_{3,k} = ewma_{3,k-1} + \frac{|e_k - \alpha e_{k-1}| - ewma_{3,k-1}}{\min(k, W)}$$

where $ewma_{3,k-1}$ is the value of the third EWMA statistic at the previous time step k−1, $e_{k-1}$ is the value of the error signal at the previous time step k−1, and α is the parameter set by parameter calculator 314.

Still referring to FIG. 5, memory 308 is shown to include a first normalized index generator 318. First normalized index generator 318 may be configured to calculate a first normalized index value (i.e., $I_1$) using the EWMA statistics generated by EWMA calculator 316. First normalized index generator 318 may calculate the first normalized index $I_1$ using the following equation:

$$I_1 = 1 - \frac{|ewma_1|}{ewma_2}$$

where the numerator is the absolute value of $ewma_1$ and the denominator is $ewma_2$.

The first index $I_1$ is designed to detect problems in a control loop (e.g., a failure to track a setpoint) by evaluating the symmetry of the process variable y around setpoint r. The assumption underlying the first normalized index $I_1$ is that disturbances acting on a control loop are drawn from a symmetrical distribution. Under this assumption, the controlled variable y is expected to fluctuate equally (over the long term) both above and below the setpoint r. When a problem arises, the controlled variable y may be unable to reach the setpoint r, thereby violating this assumption.

Examination of the EWMA statistics generated by EWMA calculator 316 shows that $ewma_1$ should have an expected value of zero when the plant is under control and when deviations about setpoint r are expected to be distributed evenly above and below setpoint r. For example, the positive errors are expected to cancel the negative errors over time, thereby resulting in an $ewma_1$ value that approaches zero. Conversely, $ewma_2$ will always have an expected value greater than zero because $ewma_2$ represents an average absolute value of the error. Since all of the $ewma_2$ values are positive, error cancelling does not occur. Small values of $ewma_2$ indicate close setpoint tracking and large values of $ewma_2$ indicate poor setpoint tracking.

The numerator in the equation for $I_1$ (i.e., $|ewma_1|$) will approach zero when the deviations about setpoint r are distributed evenly above and below setpoint r, thereby causing the value of index $I_1$ to approach one. However, when a control problem occurs and the controlled variable y is unable to reach setpoint r, the numerator (i.e., $|ewma_1|$) and denominator (i.e., $ewma_2$) will approach the same value and index $I_1$ will approach zero. The first normalized index $I_1$ is naturally normalized between zero and one. Values of $I_1$ that are close to zero indicate poor control, whereas values of $I_1$ close to one indicate good control. This normalization allows control loops of various types to be compared on the same scale.

Advantageously, the first index $I_1$ is normalized to be independent of scale so that offsets from the setpoint r can be detected, regardless of magnitude. This advantage allows for the detection of small offsets that would not exceed a defined threshold using traditional monitoring techniques. It may be important to detect small persistent offsets because they reveal that the regulatory performance of the controller may be compromised (e.g., more likely to fail), even if such offsets do not have a significant impact on current system performance. The severity of the problem may not be revealed until larger disturbances act on the system or the operating point changes. The first normalized index $I_1$ allows small persistent offsets to be detected before their effect is manifested, which may be very valuable from a performance standpoint.

Still referring to FIG. 5, memory 308 is shown to include a second normalized index generator 320. Second normalized index generator 320 may be configured to calculate a second normalized index value (i.e., $I_2$) using the EWMA statistics generated by EWMA calculator 316. Second normalized index generator 320 may calculate the second normalized index $I_2$ using the following equation:

$$I_2 = \frac{[ewma_3]^2}{(1 - \alpha^2)[ewma_2]^2}$$

where the numerator is the square of $ewma_3$ and the denominator is the square of $ewma_2$ multiplied by the quantity $(1-\alpha^2)$. The second index $I_2$ measures tracking performance in terms of an expectation based on controller tuning and process type.

The second index $I_2$ uses the variance of the error signal e to characterize how well the controller is regulating to setpoint r. The second index $I_2$ is based on $ewma_3$ and the parameter α, both of which are functions of the specified time constant $\tau_s$ for the closed-loop system. The specified time constant $\tau_s$ represents a target value for the closed-loop time constant. For PI control, a reasonable target is the dominant time constant of the plant under control (i.e., $\tau_p$). However, the closed-loop system should respond faster than the open loop plant, and therefore the closed-loop time constant $\tau_s$ should be smaller than the dominant time constant $\tau_p$ of the plant. If the closed-loop time constant $\tau_s$ is larger than the dominant time constant $\tau_p$ of the plant, the control performance would be considered poor.

Deriving the Second Normalized Index

The following paragraphs describe a new approach that derives the second normalized index $I_2$ using the specified closed-loop time constant $\tau_s$ and a variance of the error signal e. Advantageously, the approach described herein is much simpler than previous techniques and is designed to use the EWMA statistics generated by EWMA calculator 316 to enable recursive computation and minimize processing and storage requirements.

The first step is to use the realized variance of the error signal e to determine the theoretical variance of the disturbance term d. Assuming that the closed-loop system is a first-order stochastic process (i.e., an "AR(1) process"), the error signal can be expressed using the following equation:

$$e_k = ae_{k-1} + d_k$$

where the parameter $\alpha$ is the AR(1) coefficient. The parameter $\alpha$ is related to the specified time constant $\tau_s$ and the sample period $\Delta t$ as follows:

$$a = \frac{-\Delta t}{\tau_s}$$

The variance of the error signal e is related to the variance of the disturbance term d as follows:

$$\sigma_e^2 = \frac{\sigma_d^2}{1-a^2}$$

Assuming a dominant pole closed-loop system, the variance of the disturbance term can be estimated by re-arranging the preceding equation as follows:

$$v_1 = \sigma_d^2 = (1-a^2)\sigma_e^2$$

The preceding equation provides a first estimate of the variance of the disturbance term d calculated from the realized variance of the error signal e. A second estimate of the variance of the disturbance term d can be generated by predicting the disturbance signal $\hat{d}$ from the AR(1) model form and then calculating the variance of these predictions. The disturbance signal can be predicted using the following equation:

$$\hat{d}_k = e_k - ae_{k-1}$$

and the variance of the predicted disturbance signal $\mathrm{var}(\hat{d})$ can be set equal to the variable $v_2$, i.e.:

$$v_2 = \mathrm{var}(\hat{d})$$

The second normalized performance index $I_2$ can be constructed from the first and second estimates $v_1$ and $v_2$ of the variance of the disturbance d as follows:

$$I_2 = \frac{v_2}{v_1}$$

The following examples illustrate the utility of the ratio $$I_2 = \frac{v_2}{v_1}$$

provided by the second normalized index $I_2$ for characterizing the performance of the closed-loop system.

Example 1: Closed-Loop First-Order System

For this example, assume that the specified time constant is $\tau_s$ and the actual time constant of the closed-loop system is $\tau_a$. Let the AR(1) parameter for the actual closed-loop system be defined as:

$$b = e^{\frac{-\Delta t}{\tau_a}}$$

The AR(1) representation of the error signal in the actual closed-loop system is then:

$$e_k = be_{k-1} + d_k$$

The AR(1) parameter derived from the specified time constant is:

$$a = e^{\frac{-\Delta t}{\tau_s}}$$

The first estimate of the variance (i.e., $v_1$) can be calculated from the following:

$$v_1 = \sigma_e^2(1-a^2)$$

and the second estimate of the variance (i.e., $v_2$) is derived in the following steps:

$$\hat{d}_k = e_k - ae_{k-1}$$

$$v_2 = \mathrm{var}(\hat{d}_k) = E[(e_k - ae_{k-1})^2]$$

$$v_2 = E[e_k^2 - 2ae_k e_{k-1} + a^2 e_{k-1}^2]$$

$$v_2 = \sigma_e^2(1+a^2) - 2a\sigma_e^2 \rho_1$$

where $\rho_1$ is the lag-one autocorrelation of e, which for the AR(1) process is defined as:

$$\rho_1 = b$$

The expression for $v_2$ can be simplified to:

$$v_2 = \sigma_e^2(1 + a^2 - 2ab)$$

The ratio of the two variance estimates is:

$$I_2 = \frac{\sigma_e^2(1 - 2ab + a^2)}{\sigma_e^2(1 - a^2)}$$

$$I_2 = \frac{1 - 2ab + a^2}{1 - a^2}$$

Substituting the expressions for a and b into the equation for $I_2$ yields:

$$I_2 = \frac{1 - 2e^{-\frac{2\Delta t(\tau_s + \tau_a)}{\tau_s \tau_a}} + e^{-\frac{2\Delta t}{\tau_s}}}{1 - e^{-\frac{2\Delta t}{\tau_s}}}$$

As an approximation, it can be assumed that $e^x \approx 1+x$. Substituting into the previous equation for $I_2$ results in:

$$I_2 = \frac{1 - 2\left(1 - \frac{2\Delta t(\tau_s + \tau_a)}{\tau_s \tau_a}\right) + \left(1 - \frac{2\Delta t}{\tau_s}\right)}{1 - \left(1 - \frac{2\Delta t}{\tau_s}\right)} = \frac{\tau_s}{\tau_a}$$

The preceding equation yields a clean result that indicates the second normalized index $I_2$ will be approximately equal to the ratio of the specified time constant $\tau_s$ and the actual time constant $\tau_a$. For example, if the actual loop time constant $\tau_a$ is twice the estimated value $\tau_s$, the index $I_2$ will be close to 0.5. Although this example considers a first order closed-loop process, it can be deduced from the equation for $I_2$ that a general expression for the second index $I_2$ is given by:

$$I_2 = \frac{1 + a^2 - 2a\rho_1}{1 - a^2}$$

where $\rho_1$ is the lag-one autocorrelation of the actual process. In general, and for processes with similar times of decay in their impulse response functions, the introduction of higher order terms will result in smaller values for the index $I_2$. Higher order systems will yield lower index values even if the decay rate of the impulse response function is similar.

Example 2: Sinusoidal Signal Due to Loop Oscillations

For an oscillating loop, the error signal can be expressed as:

$$e(t) = K \sin(2\pi f t)$$

The variance of this error signal is:

$$\sigma_e^2 = \frac{K^2}{2}$$

and the second estimate of the variance can be written as:

$$e(t) - ae(t-\Delta t) = K \sin(2\pi f t) - aK \sin(2\pi f(t-\Delta t))$$

The preceding equation can be simplified by applying trigonometric identities to give:

$$e(t) - ae(t-\Delta t) = K\sin(2\pi f t) - aK\cos(2\pi f \Delta t)\sin(2\pi f t) +$$
$$aK\sin(2\pi f \Delta t)\cos(2\pi f t)$$
$$= K[(1 - a\cos(2\pi f \Delta t))\sin(2\pi f t) +$$
$$a\sin(2\pi f \Delta t)\cos(2\pi f t)]$$
$$= K[A\sin(2\pi f t) + B\cos(2\pi f t)]$$
$$= K\sqrt{A^2 + B^2} \sin(2\pi f(t + \varphi))$$

The second estimate of the variance $v_2$ is therefore given by:

$$v_2 = \frac{K^2(A^2 + B^2)}{2}$$

-continued $$v_2 = \frac{K^2(a^2 - 2\cos(2\pi f \Delta t)a + 1)}{2}$$

and the ratio of the two variances is:

$$I_2 = \frac{v_2}{v_1} = \frac{a^2 - 2\cos(2\pi f \Delta t)a + 1}{1 - a^2}$$

The preceding equation shows that $I_2$ is a periodic function of frequency f. As frequency f approaches zero, the value of $I_2$ is:

$$I_2(f \to 0) = \left(\frac{2}{a+1}\right) - 1$$

In most cases, the value of a will be close to one. Thus, the value for $I_2$ will be very small and close to zero when the period of oscillation is long. As the value of f increases, $I_2$ will increase until it equals one when:

$$f\Delta t = \frac{2\pi}{\cos^{-1}(a)}$$

A typical control loop might have a sample period $\Delta t$ between one-tenth and one thirtieth of the specified closed-loop time constant $$\left(\text{i.e., } \frac{\tau_s}{30} \le \Delta T \le \frac{\tau_s}{10}\right).$$

For these loops, the period of oscillation that will lead to an index value of $I_2=1$ one will be similar to the specified time constant $\tau_s$. Accordingly, an oscillating signal will only translate to a poor performance index (i.e., less than one) when the period of oscillation is longer than the time constant.

Practical Implementation

Process controller 201 may be configured to calculate EWMA statistics based on the error signal e and the specified time constant $\tau_s$. Process controller 201 may use the EWMAs to derive statistics from a batch of data without storing all the data, thereby reducing memory requirements. Second normalized index generator 320 may calculate the second performance index $I_2$ using the generated EWMA statistics.

As described above, the third EWMA statistic $ewma_3$ may be generated by EWMA calculator 316 using the following equation:

$$ewma_{3,k} = ewma_{3,k-1} + \frac{|e_k - \alpha e_{k-1}| - ewma_{3,k-1}}{\min(k, W)}$$

where the specified closed-loop time constant $\tau_s$ is used to calculate the coefficient $\alpha$ as follows:

$$\alpha = e^{-\Delta T/\tau_s}$$

where $\Delta T$ is the sample period.

An EWMA of the absolute value of the error signal is an exponentially weighted average equivalent of the mean absolute deviation (MAD). In some embodiments, second normalized index generator 320 uses the MAD as a robust alternative to variance. For a Gaussian process, the MAD is equivalent to the standard deviation of the process multiplied by a constant $\lambda$ as shown in the following equation:

$$\sigma_x = \lambda MAD(x)$$

Second normalized index generator 320 may construct the index $I_2$ from the two EWMA statistics $ewma_2$ and $ewma_3$ as follows:

$$\sqrt{I_2} = \frac{\lambda ewma_{3,k}}{\lambda \sqrt{1-a^2}\, ewma_{2,k}}$$

$$I_2 = \frac{[ewma_3]^2}{(1-\alpha^2)[ewma_2]^2}$$

The constant $\lambda$ cancels when equivalent EWMA statistics are used in the numerator and denominator. In various embodiments, second normalized index generator 320 may use the square-rooted version of the equation for $I_2$ or the squared version. Either version can be used to assess system performance without changing the benchmark value of one.

Figure 6:
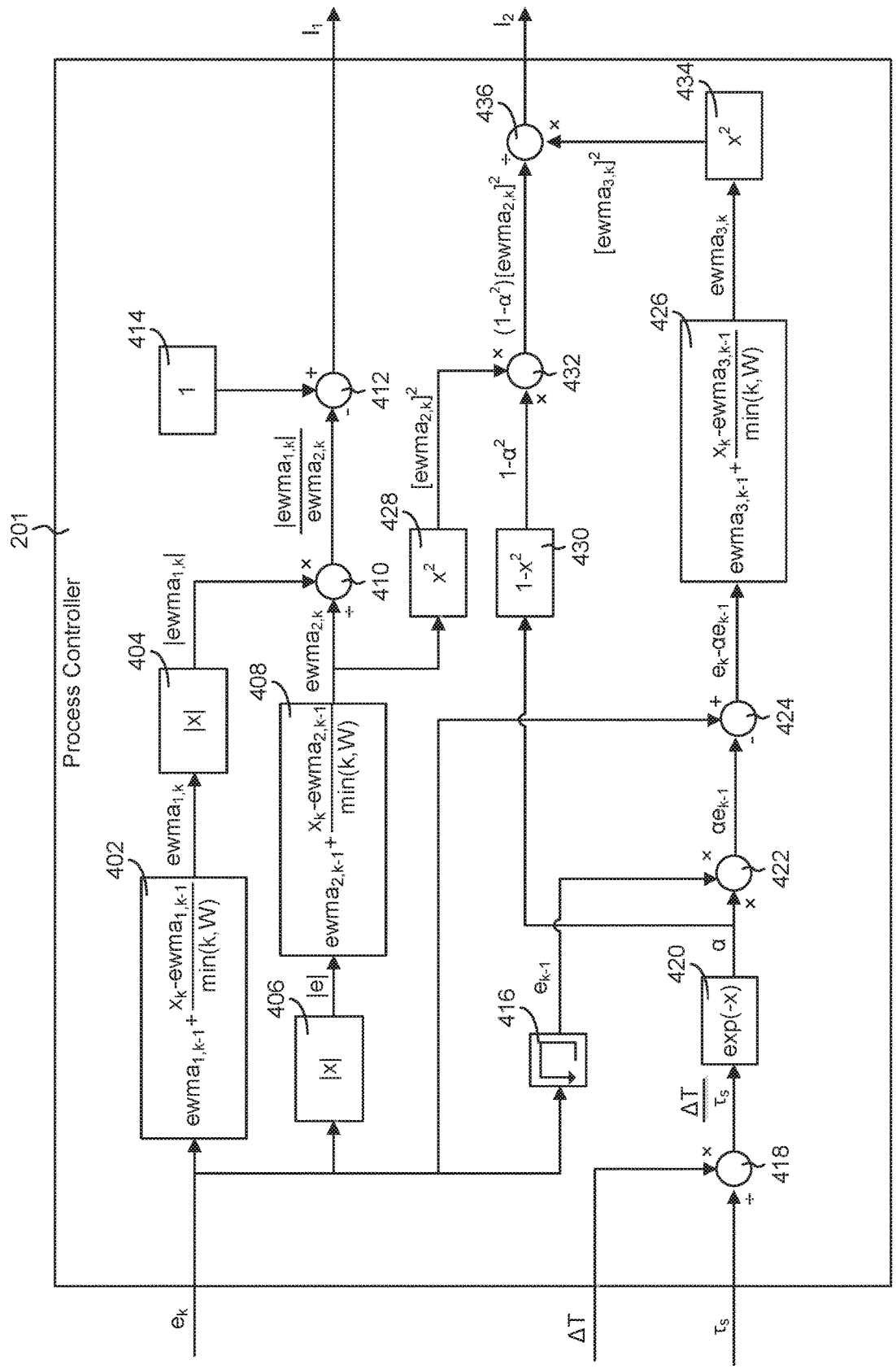
FIG. 6 is a block diagram illustrating the operations that may be performed by the process controller of FIG. 4 to calculate a first normalized performance index $I_1$ and a second normalized performance index $I_2$, according to an exemplary embodiment.

Referring now to FIG. 6, a block diagram illustrating the operations performed by process controller 201 to calculate the first normalized performance index $I_1$ and the second normalized performance index $I_2$ is shown, according to an exemplary embodiment. The operations illustrated in FIG. 6 may be performed by a processing circuit (e.g., processing circuit 304) of process controller 201 in an online environment (e.g., as part of a live process control system) to calculate and update the normalized performance indices $I_1$ and $I_2$ as new data is received.

Process controller 201 is shown receiving an error signal $e_k$. In various embodiments, process controller 201 may receive error signal $e_k$ from a subtractor element that calculates the difference between a setpoint $r_k$ and a feedback signal $y_k$, or process controller 201 may calculate error signal $e_k$ using the feedback signal $y_k$ and the setpoint $r_k$ (e.g., $e_k = r_k - y_k$). Process controller 201 may provide error signal $e_k$ as an input (x) to a first EWMA block 402. First EWMA block 402 uses the error signal $e_k$ to calculate the first EWMA statistic $ewma_{1,k}$ using the equation:

$$ewma_{1,k} = ewma_{1,k-1} + \frac{x_k - ewma_{1,k-1}}{\min(k, W)}$$

where the variable x is the input (i.e., $e_k$) provided to EWMA block 402 and $ewma_{1,k-1}$ is the previous value of the first EWMA statistic. Process controller 201 provides the first EWMA statistic $ewma_{1,k}$ to absolute value block 404. Absolute value block 404 calculates the absolute value of the first EWMA statistic (i.e., $|ewma_{1,k}|$).

Process controller 201 may also provide the error signal $e_k$ to absolute value block 406. Absolute value block 406 calculates the absolute value of the error signal (i.e., $|e_k|$). Process controller 201 provides the absolute value of the error signal $|e_k|$ as an input to a second EWMA block 408. Second EWMA block 408 uses the absolute value of the error signal to calculate the second EWMA statistic $ewma_{2,k}$ using the equation:

$$ewma_{2,k} = ewma_{2,k-1} + \frac{x_k - ewma_{2,k-1}}{\min(k, W)}$$

where the variable x is the input (i.e., $|e_k|$) provided to EWMA block 408 and $ewma_{2,k-1}$ is the previous value of the second EWMA statistic.

Process controller 201 may provide the absolute value of the first EWMA statistic $|ewma_{1,k}|$ and the second EWMA statistic $ewma_{2,k}$ to division block 410. Division block 410 divides the absolute value of the first EWMA statistic by the second EWMA statistic to generate the quotient $$\frac{|ewma_{1,k}|}{ewma_{2,k}}$$

and provide the generated quotient to subtractor block 412. Subtractor block 412 subtracts the quotient $$\frac{|ewma_{1,k}|}{ewma_{2,k}}$$

from one (provided by constant value block 414) to generate the first normalized index $I_1$:

$$I_1 = 1 - \frac{|ewma_{1,k}|}{ewma_{2,k}}$$

Still referring to FIG. 6, process controller 201 may provide the error signal $e_k$ to time delay block 416. Time delay block 416 collects samples of $e_k$ and holds the samples until the next time step k+1. At each time step k, time delay block 416 outputs the error signal $e_{k-1}$ from the previous time step.

Process controller 201 is shown receiving a specified time constant $\tau_s$ and a sample period $\Delta T$. In various embodiments, process controller 201 receives time constant $\tau_s$ from an outside data source, sets $\tau_s$ equal to the integral time $T_i$, or calculates time constant $\tau_s$ as described with reference to time constant estimator 214. Sample period $\Delta T$ may also be received from an outside data source or calculated by process controller 201. In some embodiments, the sample period $\Delta T$ is between one-tenth and one-thirtieth of the specified closed-loop time constant $$\left(\text{i.e., } \frac{\tau_s}{30} \leq \Delta T \leq \frac{\tau_s}{10}\right).$$

Process controller 201 may provide the specified time constant $\tau_s$ and the sample period $\Delta T$ to division block 418. Division block 418 divides the sample period by the specified time constant to generate the quotient $$\frac{\Delta T}{\tau_s}$$

and provide the generated quotient to exponential block 420. Exponential block 420 calculates the parameter $$\alpha = e^{-\frac{\Delta T}{T_s}}$$

and provides the parameter α to multiplier block 422. Multiplier block 422 multiplies the parameter α by the time delayed error signal $e_{k-1}$ and provides the product $\alpha e_{k-1}$ to subtractor block 424. Subtractor block 424 subtracts the product $\alpha e_{k-1}$ from the error signal $e_k$ to generate the quantity $e_k - \alpha e_{k-1}$ and provides the generated quantity to third EWMA block 426. Third EWMA block 426 uses the quantity $e_k - \alpha e_{k-1}$ as an input to calculate the third EWMA statistic $ewma_{3,k}$ according to the following equation:

$$ewma_{3k} = ewma_{3,k-1} + \frac{x_k - ewma_{3,k-1}}{\min(k, W)}$$

where the variable x is the input (i.e., $e_k - \alpha e_{k-1}$) provided to EWMA block 426 and $ewma_{3,k-1}$ is the previous value of the third EWMA statistic. Expression block 434 squares the third EWMA statistic and provides the result (i.e., $[ewma_{3,k}]^2$) to division block 436.

Process controller 201 may square the second EWMA statistic $ewma_{2,k}$ at expression block 428 and provide the square of the second EWMA statistic (i.e., $[ewma_{2,k}]^2$) to multiplier block 432. Process controller 201 also calculates the quantity $1-\alpha^2$ at expression block 430 and provides the quantity $1-\alpha^2$ to multiplier block 432. Multiplier block 432 calculates the product $(1-\alpha^2)[ewma_{2,k}]^2$ and provides the product to division block 436. Division block 436 divides the square of the third EWMA statistic (i.e., $[ewma_{3,k}]^2$) by the quantity $(1-\alpha^2)[ewma_{2,k}]^2$ to calculate the second normalized performance index $I_2$:

$$I_2 = \frac{[ewma_3]^2}{(1-\alpha^2)[ewma_2]^2}$$

Process for Generating a Normalized Performance Index

Figure 7:
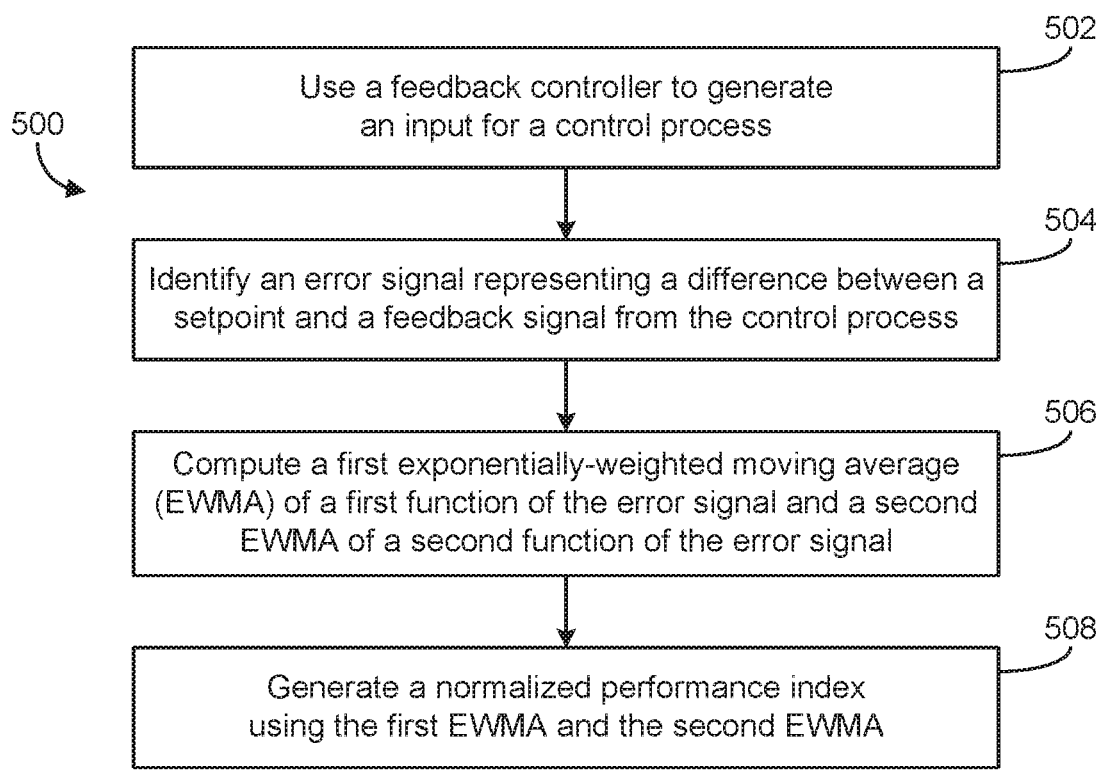
FIG. 7 is a flowchart of a process for generating a normalized performance index for a feedback control loop, according to an exemplary embodiment.

Referring now to FIG. 7, a flowchart of a process 500 for generating a normalized performance index for a feedback control loop is shown, according to an exemplary embodiment. Process 500 may be performed by process controller 201 and/or PI controller 102 as described with reference to FIGS. 3-6. Process 500 is shown to include using a feedback controller to generate an input for a control process (step 502). The feedback controller may be a controller for a building management system or part of a building management system (e.g., a HVAC control system, a lighting control system, a power control system, a security system, etc.). The feedback controller may be part of a local or distributed control system used to control a single building (e.g., building 12), a system of buildings, or one or more zones within a building (e.g., building zone 18). In some implementations, the feedback controller may be part of a METASYS® brand control system as sold by Johnson Controls, Inc.

The control process may be any system or process monitored and/or controlled by the feedback controller (e.g., plant 104, plant 204, etc.). The control process may be a dynamic system (e.g., a building, a system of buildings, a zone within a building, etc.) including one or more variable input devices (e.g., dampers, air handling units, chillers, boilers, actuators, motors, etc.) and one or more measurement devices (e.g., temperature sensors, pressure sensors, voltage sensors, flow rate sensors, humidity sensors, etc.). In some implementations, the control process is a zone within a building (e.g., a room, a floor, an area, building zone 18, etc.) and the feedback controller is used to control temperature within the zone. For example, the feedback controller may actively adjust a damper position in a HVAC unit (e.g., an air handling unit (AHU), a variable air volume (VAV) box, etc.) for increasing or decreasing the flow of conditioned air (e.g., heated, chilled, humidified, etc.) into the building zone.

The control process may receive a combined input that includes both the control signal u from the feedback controller and a disturbance signal d. In some embodiments, the control process may be modeled as a first-order plant having a transfer function $$G_p(s) = \frac{K_p}{1 + \tau_p s} e^{-Ls},$$

where $\tau_p$ is the dominant time constant, L is the time delay, and $K_p$ is the process gain. In other embodiments, the control process may be modeled as a second-order, third-order, or higher order plant. The control process may produce a feedback signal y in response to control signal u and disturbance signal d.

The feedback controller may produce a control signal u in response to the error signal e. In some embodiments, the feedback controller is a proportional-integral controller. The feedback controller may have a transfer function $$G_c(s) = \frac{K_c(1 + T_i s)}{T_i s},$$

where $K_c$ is the controller gain and $T_i$ is the integral time. Controller gain $K_c$ and integral time $T_i$ are the control parameters which define the response of the feedback controller to error signal e. That is, controller gain $K_c$ and integral time $T_i$ control how the feedback controller translates error signal e into control signal u. In some embodiments, $K_c$ and $T_i$ are the only control parameters. In other embodiments, different control parameters (e.g., a derivative control parameter, etc.) may be used in addition to or in place of control parameters $K_c$ and $T_i$.

In some embodiments, the feedback controller includes an adaptive tuner. The adaptive tuner may periodically adjust (e.g., calibrate, tune, update, etc.) the control parameters used by the feedback controller in translating error signal e into control signal u. In various embodiments, the feedback controller may be a pattern recognition adaptive controller (PRAC), a model recognition adaptive controller (MRAC), a model predictive controller (MPC) or any other type of adaptive tuning and/or feedback controller.

Still referring to FIG. 7, process 500 is shown to include identifying an error signal representing a difference between a setpoint and a feedback signal from the control process (step 504). Identifying the error signal may include receiving the error signal e from an outside data source or calculating the error signal e. In some embodiments, step 504 includes subtracting the feedback signal y from the setpoint r to generate the error signal e (e.g., =r−y).

Still referring to FIG. 7, process 500 is shown to include computing a first exponentially-weighted moving average (EWMA) of a first function of the error signal and a second EWMA of a second function of the error signal (step 506).

In some embodiments, the first function of the error signal is the error signal without modification (e.g., $e_k$) and the second function of the error signal is an absolute value of the error signal (e.g., $|e_k|$). In other embodiments, the first function of the error signal is a time-differenced error signal modified by a parameter (e.g., $e_k - \alpha e_{k-1}$) and the second function of the error signal is the absolute value of the error signal.

In some embodiments, step 506 includes calculating three different EWMA statistics. For example, step 506 may include calculating a first EWMA (i.e., $ewma_{1,k}$) of unmodified error signal samples using the following equation:

$$ewma_{1,k} = ewma_{1,k-1} + \frac{e_k - ewma_{1,k-1}}{\min(k, W)}$$

where $ewma_{1,k-1}$ is the value of the first EWMA statistic at the previous time step (k−1), $e_k$ is the value of the error signal at the current time step k, and W is the effective number of samples used in the weighted averages. The use of the minimum in the denominator of the update term causes the EWMA statistic to begin as a straight average until the number of samples reaches the window size, at which point the statistic becomes exponentially-weighted.

Step 506 may include calculating a second EWMA (i.e., $ewma_{2,k}$) of the absolute value of the error signal using the following equation:

$$ewma_{2,k} = ewma_{2,k-1} + \frac{|e_k| - ewma_{2,k-1}}{\min(k, W)}$$

where $ewma_{2,k-1}$ is the value of the second EWMA statistic at the previous time step k−1 and $|e_k|$ is the absolute value of the error signal at the current time step k.

Step 506 may include calculating a third EWMA (i.e., $ewma_{3,k}$) of a time-differenced error signal modified by the parameter $\alpha$ using the following equation:

$$ewma_{3,k} = ewma_{3,k-1} + \frac{|e_k - \alpha e_{k-1}| - ewma_{3,k-1}}{\min(k, W)}$$

where $ewma_{3,k-1}$ is the value of the third EWMA statistic at the previous time step k−1, $e_{k-1}$ is the value of the error signal at the previous time step k−1, and $\alpha$ is the parameter based on a specified time closed-loop time constant $\tau_s$. Step 506 may include multiplying the parameter $\alpha$ by a value of the error signal from a previous time step $e_{k-1}$ and subtracting a result of the multiplying (e.g., $\alpha e_{k-1}$) from a value of the error signal for a current time step $e_k$ to generate the time-differenced error signal modified by the parameter (e.g., $e_k - \alpha e_{k-1}$).

In some embodiments, step 506 includes calculating the parameter $\alpha$. Calculating the parameter $\alpha$ may include identifying a sample period $\Delta T$ and a specified closed-loop time constant $\tau_s$ for the feedback control loop dividing the sample period by the specified closed-loop time constant. In some embodiments, step 506 includes identifying an integral time parameter $T_I$ for the feedback controller and using the integral time parameter as the specified closed-loop time constant $\tau_s$. In other embodiments, step 506 includes using the error signal e to estimate a dominant time constant for the control process $\tau_p$ and using the estimated time constant $\tau_p$ for the control process as the specified closed-loop time constant $\tau_s$.

Still referring to FIG. 7, process 500 is shown to include generating a normalized performance index using the first EWMA and the second EWMA (step 508). Step 508 may include using the first EWMA generated in step 506 (e.g., $ewma_1$, $ewma_2$, or $ewma_3$) to calculate a numerator, using the second EWMA generated in step 506 (e.g., $ewma_1$, $ewma_2$, or $ewma_3$) to calculate a denominator, and dividing the numerator by the denominator to generate a normalized ratio of the first EWMA to the second EWMA. In some embodiments, step 508 includes calculating an absolute value of the first EWMA and dividing the absolute value of the first EWMA by the second EWMA. For example, step 508 may include calculating a first normalized index $I_1$ using the following equation:

$$I_1 = 1 - \frac{|ewma_1|}{ewma_2}$$

where the numerator is the absolute value of $ewma_1$ and the denominator is $ewma_2$.

The first index $I_1$ is designed to detect problems in a control loop (e.g., a failure to track a setpoint) by evaluating the symmetry of the process variable y around setpoint r. The assumption underlying the first normalized index $I_1$ is that disturbances acting on a control loop are drawn from a symmetrical distribution. Under this assumption, the controlled variable y is expected to fluctuate equally (over the long term) both above and below the setpoint r. When a problem arises, the controlled variable y may be unable to reach the setpoint r, thereby violating this assumption.

Examination of the EWMA statistics generated in step 506 shows that $ewma_1$ should have an expected value of zero when the plant is under control and when deviations about setpoint r are expected to be distributed evenly above and below setpoint r. For example, the positive errors are expected to cancel the negative errors over time, thereby resulting in an $ewma_1$ value that approaches zero. Conversely, $ewma_2$ will always have an expected value greater than zero because $ewma_2$ represents an average absolute value of the error. Since all of the $ewma_2$ values are positive, error cancelling does not occur. Small values of $ewma_2$ indicate close setpoint tracking and large values of $ewma_2$ indicate poor setpoint tracking.

The numerator in the equation for $I_1$ (i.e., $|ewma_1|$) will approach zero when the deviations about setpoint r are distributed evenly above and below setpoint r, thereby causing the value of index $I_1$ to approach one. However, when a control problem occurs and the controlled variable y is unable to reach setpoint r, the numerator (i.e., $|ewma_1|$) and denominator (i.e., $ewma_2$) will approach the same value and index $I_1$ will approach zero. The first normalized index $I_1$ is naturally normalized between zero and one. Values of $I_1$ that are close to zero indicate poor control, whereas values of $I_1$ close to one indicate good control. This normalization allows control loops of various types to be compared on the same scale.

Advantageously, the first index $I_1$ is normalized to be independent of scale so that offsets from the setpoint r can be detected, regardless of magnitude. This advantage allows for the detection of small offsets that would not exceed a defined threshold using traditional monitoring techniques. It may be important to detect small persistent offsets because they reveal that the regulatory performance of the controller may be compromised (e.g., more likely to fail), even if such offsets do not have a significant impact on current system performance. The severity of the problem may not be revealed until larger disturbances act on the system or the operating point changes. The first normalized index $I_1$ allows small persistent offsets to be detected before their effect is manifested, which may be very valuable from a performance standpoint.

In some embodiments, step 508 includes using the first EWMA generated in step 506 (e.g., $ewma_1$, $ewma_2$, or $ewma_3$) to calculate a numerator, using the second EWMA generated in step 506 (e.g., $ewma_1$, $ewma_2$, or $ewma_3$) and the parameter $\alpha$ to calculate a denominator, and dividing the numerator by the denominator to generate a normalized ratio of the first EWMA to the second EWMA modified by the parameter. For example, step 508 may include calculating the second normalized index $I_2$ using the following equation:

$$I_2 = \frac{[ewma_3]^2}{(1-\alpha^2)[ewma_2]^2}$$

where the numerator is the square of $ewma_3$ and the denominator is the square of $ewma_2$ multiplied by the quantity $(1-\alpha^2)$. The second index $I_2$ measures tracking performance in terms of an expectation based on controller tuning and process type.

The second index $I_2$ uses the variance of the error signal e to characterize how well the controller is regulating to setpoint r. The second index $I_2$ is based on $ewma_3$ and the parameter $\alpha$, both of which are functions of the specified time constant $\tau_s$ for the closed-loop system. The specified time constant $\tau_s$ represents a target value for the closed-loop time constant. For PI control, a reasonable target is the dominant time constant of the plant under control (i.e., $\tau_p$). However, the closed-loop system should respond faster than the open loop plant, and therefore the closed-loop time constant $\tau_s$ should be smaller than the dominant time constant $\tau_p$ of the plant. If the closed-loop time constant $\tau_s$ is larger than the dominant time constant $\tau_p$ of the plant, the control performance would be considered poor.

Advantageously, process 500 can be implemented in a feedback controller with minimal data storage capacity and minimal computing power. The EWMA statistics generated in process 500 are relatively easy to calculate and can be generated recursively without requiring the storage of batch data. In some embodiments, process 500 includes recursively updating the first EWMA and the second EWMA in response to receiving a new measurement of the feedback signal from the control process. The EWMA statistics generated in step 506 may be updated each time a new measurement of the feedback signal or the error signal is obtained, thereby allowing process 500 to be performed by a controller in an online operating environment (e.g., as opposed to operating offline or using batch and/or historical data). Additionally, both indices generated by process 500 are normalized to allow different control loops to be compared on the same scale.

Using Normalized Performance Indices for Setpoint Alarming

Figure 8:
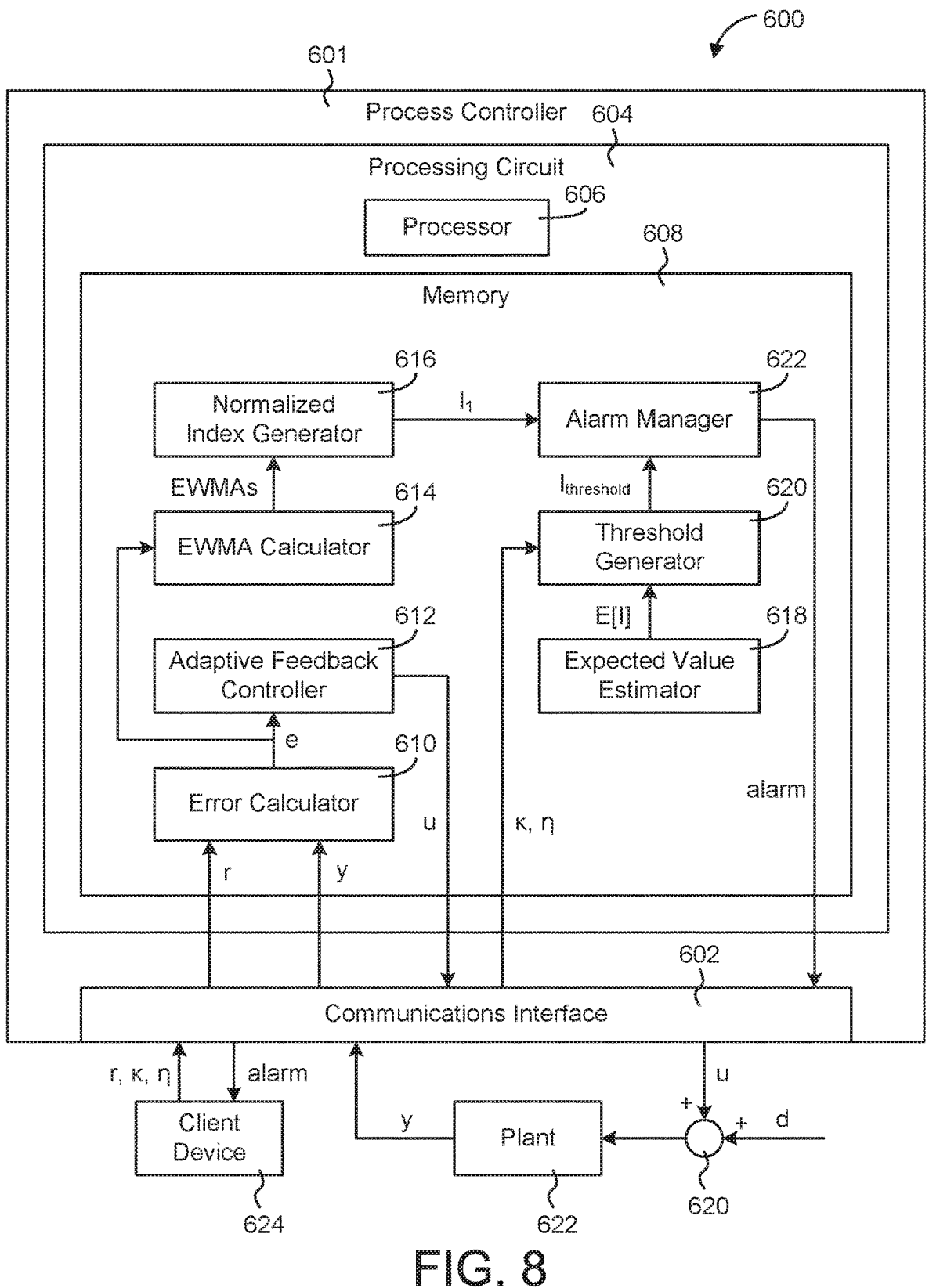
FIG. 8 is another block diagram illustrating the process controller of FIG. 4 in greater detail, according to another exemplary embodiment.

Referring now to FIG. 8, a block diagram of another closed-loop control system 600 is shown, according to an exemplary embodiment. System 600 may be configured to use normalized performance indices for setpoint alarming. Setpoint alarming is a type of setpoint tracking that generates alarms based on the value of a monitored variable relative to a setpoint. For example, the performance of a controlled process may be evaluated by determining how well the feedback signal y tracks the setpoint r. Conventional setpoint alarming systems set thresholds around the setpoint r and generate alarms if the feedback signal y is outside the thresholds (e.g., less than a minimum threshold or greater than a maximum threshold) for a predetermined amount of time. A problem with conventional setpoint alarming systems is that both the thresholds and the time limits are difficult to determine and may be different for various control loops.

System 600 may perform setpoint alarming using one or more of the normalized performance indices described with reference to FIGS. 5-6. For example, system 600 may use the first normalized performance index $I_1$ as a measure of setpoint tracking. As previously described, values of $I_1$ near zero indicate poor setpoint tracking, whereas values of $I_1$ near one indicate good setpoint tracking. System 600 may determine an expected value for the normalized performance index $I_1$ that results from a setpoint error of a given magnitude and duration. An exemplary process for determining the expected value of the performance index $I_1$ for a given setpoint error is described in greater detail below. System 600 may use the expected value as a threshold $I_{threshold}$ for setpoint alarming. For example, system 600 may compare the actual value of the normalized performance index $I_1$ to the threshold value $I_{threshold}$ and generate a setpoint tracking alarm when the actual value of $I_1$ is less than the threshold $I_{threshold}$.

Advantageously, both the magnitude and duration of the setpoint error used to calculate the threshold $I_{threshold}$ may be specified as normalized parameters that are control loop agnostic. In other words, the magnitude and duration of the setpoint error used to calculate $I_{threshold}$ do not depend on any parameters or values specific to a particular control loop. For example, the magnitude of the setpoint error used to calculate the threshold $I_{threshold}$ may be specified as a multiple $\kappa$ of the standard deviation $\sigma$ of the error signal as shown in the following equation:

$$\kappa = \frac{\epsilon}{\sigma}$$

where $\epsilon$ is the magnitude of the setpoint error and $\sigma$ is the standard deviation of the error signal under normal control. Similarly, the duration of the setpoint error used to calculate the threshold $I_{threshold}$ may be specified as a multiple $\eta$ of the EWMA time constant $\tau$ as shown in the following equation:

$$\eta = \frac{t}{\tau}$$

where t is the time that the setpoint error persists and $\tau$ is the EWMA time constant.

System 600 may use the control loop agnostic parameters $\kappa$ and $\eta$ to generate the threshold $I_{threshold}$ for the normalized index value $I_1$ (i.e., $I_1=f(\kappa,\eta)$). This results in a threshold $I_{threshold}$ that is also control loop agnostic and can be applied to any control loop. For example, specifying the values $\kappa=4$ and $\eta=5$ may cause system 600 to generate a threshold $I_{threshold}$ that represents the expected value of the normalized performance index $I_1$ when the setpoint error is 4 times the standard deviation $\sigma$ of the error signal and persists for 5 times as long as the EWMA time constant τ, regardless of the values of σ and τ. Accordingly, it is not necessary to determine the values of either the standard deviation σ of the error signal or the EWMA time constant τ to calculate the threshold $I_{threshold}$. This allows the same value of the threshold $I_{threshold}$ to be used for setpoint alarming in multiple different control loops. Exemplary systems and methods for generating and using the threshold $I_{threshold}$ for setpoint alarming are described in greater detail below.

Still referring to FIG. 8, system 600 is shown to include a process controller 601. Process controller 601 is shown to include a communications interface 602. Communications interface 602 may include any number of jacks, wire terminals, wire ports, wireless antennas, or other communications adapters, hardware, or devices for conducting electronic data communications between process controller 601 and various external systems or devices. For example, communications interface 602 may facilitate communications between process controller 601 and plant 622, client device 624, a supervisory controller, and/or other external systems or devices. Communications interface 302 may send or receive information over a local area network (LAN), wide area network (WAN), and/or a distributed network such as the Internet. Communications interface 302 may include various types of communications electronics (e.g., receivers, transmitters, transceivers, modulators, demodulators, filters, communications processors, communication logic modules, buffers, decoders, encoders, encryptors, amplifiers, etc.) configured to provide or facilitate the communication of the signals described herein.

Communications interface 602 is shown receiving a setpoint r and alarm parameters κ and η from client device 624. Client device 624 may be a mobile or non-mobile computing device configured to communicate with process controller 601. For example, client device 624 may be a laptop computer, a tablet, a smartphone, a PDA, a desktop computer, a computer workstation, a client terminal, a wall-mounted thermostat, or other type of user-operable electronic device. Client device 624 may have a user interface configured to receive information from a user (e.g., a keyboard, a mouse, a touch-sensitive display, buttons, dials, etc.) and present information to a user (e.g., an electronic display, speakers, a touch-sensitive display, etc.). In some embodiments, a user specifies setpoint r and alarm parameters κ and η via client device 624. In other embodiments, one or more of the setpoint r and alarm parameters κ and η may be received from a different source or automatically generated by process controller 601. For example, the setpoint r and/or the alarm parameters κ and η may be provided by a supervisory controller or other device in communication with process controller 601.

Communications interface 602 is shown providing an alarm to client device 624. In various embodiments, the alarm may be provided to client device 624, a supervisory controller, a building management system, an alarm management system, and/or any other system or device in communication with process controller 601. An alarm may be generated by process controller 601 when the value of the normalized performance index $I_1$ is less than the calculated threshold $I_{threshold}$. In some embodiments, both the normalized performance index $I_1$ and the threshold $I_{threshold}$ are calculated by process controller 601, as described in greater detail below. In other embodiments, the normalized performance index $I_1$ is generated by process controller 601 based on the feedback signal y from plant 622 and the setpoint r, whereas the threshold $I_{threshold}$ may be received as a data input via communications interface 602 or retrieved from memory 608.

Communications interface 602 is shown receiving a feedback signal y from plant 622 and providing a control signal u to summation element 620. Plant 622 may be the same or similar to plant 104 and/or plant 204 as described with reference to FIGS. 3-4. For example, plant 622 may be modeled as a first-order plant having a transfer function $$G_p(s) = \frac{K_p}{1+\tau_p s}e^{-Ls},$$

where $\tau_p$ is the dominant time constant, L is the time delay, and $K_p$ is the process gain. In other embodiments, plant 622 may be modeled as a second-order, third-order, or higher order plant. Plant 622 may produce a feedback signal y in response to control signal u and disturbance signal d.

Summation element 620 may be the same or similar to summation element 108 and/or summation element 208 as described with reference to FIGS. 3-4. For example, summation element 620 is shown receiving the control signal u from process controller 601 and combining the control signal with a disturbance signal d. The combined output of summation element 620 may be provided as an input to plant 622.

Process controller 610 is shown to include a processing circuit 604 having a processor 606 and memory 608. Processor 606 can be implemented as a general purpose processor, an application specific integrated circuit (ASIC), one or more field programmable gate arrays (FPGAs), a group of processing components, or other suitable electronic processing components. Memory 608 (e.g., memory device, memory unit, storage device, etc.) may include one or more devices (e.g., RAM, ROM, Flash memory, hard disk storage, etc.) for storing data and/or computer code for completing or facilitating the various processes, layers and modules described in the present disclosure. Memory 608 may be or include volatile memory or non-volatile memory. Memory 608 may include database components, object code components, script components, or any other type of information structure for supporting the various activities and information structures described in the present application. According to an exemplary embodiment, memory 608 is communicably connected to processor 606 via processing circuit 604 and includes computer code for executing (e.g., by processing circuit 604 and/or processor 606) one or more processes described herein.

Still referring to FIG. 6, process controller 601 is shown to include an error calculator 610. Error calculator 610 is shown receiving the feedback signal y and the setpoint r from communications interface 602. Error calculator 610 may compare the feedback signal y with a setpoint r to generate an error signal e. For example, error calculator 610 may subtract the feedback signal y from the setpoint r to calculate the error signal e (i.e., e=r−y). Error calculator 610 may provide the error signal e to adaptive feedback controller 612 for use in generating the control signal u and to EWMA calculator 614 for use in generating the EWMAs.

Process controller 610 is shown to include an adaptive feedback controller 612. Adaptive feedback controller 612 may be the same or similar to adaptive feedback controller 310, as described with reference to FIG. 5. For example, adaptive feedback controller 612 may include the functionality of a pattern recognition adaptive controller (PRAC), a model recognition adaptive controller (MRAC), or any other type of adaptive tuning or feedback controller. In some embodiments, adaptive feedback controller 612 is configured to perform the functions of PI controller 202 and adaptive tuner 212, as described with reference to FIG. 4. Adaptive feedback controller 612 is shown receiving the error signal from error calculator 610. Adaptive feedback controller 612 may calculate a control signal u for plant 622 based on the error signal e. The control signal u may be communicated to plant 622 via communications interface 602.

Process controller 601 is shown to include an EWMA calculator 614. EWMA calculator 614 may be the same or similar to EWMA calculator 316, as described with reference to FIG. 5. For example, EWMA calculator 614 may be configured to calculate EWMA statistics using the error signal $e_k$. In some embodiments, EWMA calculator 614 calculates three different EWMA statistics. EWMA calculator 614 may calculate a first EWMA (i.e., $ewma_{1,k}$) of unmodified error signal samples using the following equation:

$$ewma_{1k} = ewma_{1,k-1} + \frac{e_k - ewma_{1,k-1}}{\min(k, W)}$$

where $ewma_{1,k-1}$ is the value of the first EWMA statistic at the previous time step (k−1), $e_k$ is the value of the error signal at the current time step k, and W is the effective number of samples used in the weighted averages (e.g., the forgetting window). The use of the minimum in the denominator of the update term causes the EWMA statistic to begin as a straight average until the number of samples reaches the window size, at which point the statistic becomes exponentially-weighted. In some embodiments, EWMA calculator 614 calculates the first EWMA statistic using the following equation:

$$ewma_{1,k} = \left(1 - \frac{1}{W}\right)ewma_{1k-1} + \frac{1}{W}e_k$$

EWMA calculator 614 may calculate a second EWMA (i.e., $ewma_{2,k}$) of the absolute value of the error signal using the following equation:

$$ewma_{2,k} = ewma_{2,k-1} + \frac{|e_k| - ewma_{2,k-1}}{\min(k, W)}$$

where $ewma_{2,k-1}$ is the value of the second EWMA statistic at the previous time step k−1 and $|e_k|$ is the absolute value of the error signal at the current time step k. In some embodiments, EWMA calculator 614 calculates the second EWMA statistic using the following equation:

$$ewma_{2,k} = \left(1 - \frac{1}{W}\right)ewma_{2,k-1} + \frac{1}{W}|e_k|$$

EWMA calculator 614 may calculate a third EWMA (i.e., $ewma_{3,k}$) of a time-differenced error signal modified by the parameter α using the following equation:

$$ewma_{3,k} = ewma_{3,k-1} + \frac{|e_k - \alpha e_{k-1}| - ewma_{3,k-1}}{\min(k, W)}$$

where $ewma_{3,k-1}$ is the value of the third EWMA statistic at the previous time step k−1, $e_{k-1}$ is the value of the error signal at the previous time step k−1, and α is the parameter set by parameter calculator 314. In some embodiments, EWMA calculator 614 calculates the third EWMA statistic using the following equation:

$$ewma_{3,k} = \left(1 - \frac{1}{W}\right)ewma_{3,k-1} + \frac{1}{W}|e_k - \alpha e_{k-1}|$$

In some embodiments, EWMA calculator 614 calculates only the first EWMA statistic $ewma_{1,k}$ and the second EWMA statistic $ewma_{2,k}$. In other embodiments, EWMA calculator 614 also calculates the third EWMA statistic $ewma_{3,k}$ in addition to the first and second EWMA statistics. EWMA calculator 614 may provide the calculated EWMA statistics to normalized index generator 616.

Still referring to FIG. 8, process controller 601 is shown to include a normalized index generator 616. Normalized index generator 616 may calculate one or more normalized performance indices using the EWMA statistics generated by EWMA calculator 614. In some embodiments, normalized index generator 616 includes the functionality of first normalized index generator 318 and second normalized index generator 320, as described with reference to FIG. 5. For example, normalized index generator 616 may calculate the first normalized index $I_1$ using the following equation:

$$I_1 = 1 - \frac{|ewma_1|}{ewma_2}$$

where the numerator is the absolute value of $ewma_1$ and the denominator is $ewma_2$.

The first index $I_1$ is designed to detect problems in a control loop (e.g., a failure to track a setpoint) by evaluating the symmetry of the process variable y around setpoint r. The assumption underlying the first normalized index $I_1$ is that disturbances acting on a control loop are drawn from a symmetrical distribution. Under this assumption, the controlled variable y is expected to fluctuate equally (over the long term) both above and below the setpoint r. When a problem arises, the controlled variable y may be unable to reach the setpoint r, thereby violating this assumption.

Examination of the EWMA statistics generated by EWMA calculator 614 shows that $ewma_1$ should have an expected value of zero when the plant is under control and when deviations about setpoint r are expected to be distributed evenly above and below setpoint r. For example, the positive errors are expected to cancel the negative errors over time, thereby resulting in an $ewma_1$ value that approaches zero. Conversely, $ewma_2$ will always have an expected value greater than zero because $ewma_2$ represents an average absolute value of the error. Since all of the $ewma_2$ values are positive, error cancelling does not occur. Small values of $ewma_2$ indicate close setpoint tracking and large values of $ewma_2$ indicate poor setpoint tracking.

The numerator in the equation for $I_1$ (i.e., $|ewma_1|$) will approach zero when the deviations about setpoint r are distributed evenly above and below setpoint r, thereby causing the value of index $I_1$ to approach one. However, when a control problem occurs and the controlled variable y is unable to reach setpoint r, the numerator (i.e., |ewma$_1$|) and denominator (i.e., ewma$_2$) will approach the same value and index $I_1$ will approach zero. The first normalized index $I_1$ is naturally normalized between zero and one. Values of $I_1$ that are close to zero indicate poor control, whereas values of $I_1$ close to one indicate good control. This normalization allows control loops of various types to be compared on the same scale.

In some embodiments, normalized index generator 161 calculates the second normalized index $I_2$ using the following equation:

$$I_2 = \frac{[ewma_3]^2}{(1-\alpha^2)[ewma_2]^2}$$

where the numerator is the square of ewma$_3$ and the denominator is the square of ewma$_2$ multiplied by the quantity $(1-\alpha^2)$. The second index $I_2$ measures tracking performance in terms of an expectation based on controller tuning and process type.

The second index $I_2$ uses the variance of the error signal e to characterize how well the controller is regulating to setpoint r. The second index $I_2$ is based on ewma$_3$ and the parameter $\alpha$, both of which are functions of the specified time constant $\tau_s$ for the closed-loop system. The specified time constant $\tau_s$ represents a target value for the closed-loop time constant. For PI control, a reasonable target is the dominant time constant of the plant under control (i.e., $\tau_p$). However, the closed-loop system should respond faster than the open loop plant, and therefore the closed-loop time constant $\tau_s$ should be smaller than the dominant time constant $\tau_p$ of the plant. If the closed-loop time constant $\tau_s$ is larger than the dominant time constant $\tau_p$ of the plant, the control performance would be considered poor.

In some embodiments, normalized index generator 616 calculates only the first index $I_1$. In other embodiments, normalized index generator 616 also calculates the second index $I_2$. Normalized index generator 616 may provide one or both of the calculated indices to alarm manager 622.

Still referring to FIG. 8, process controller 600 is shown to include an expected value estimator 618. Expected value estimator 618 may be configured to estimate the value of the first normalized index $I_1$ expected to result from a given (e.g., predetermined) setpoint error. The setpoint error may be an actual setpoint error defined by the actual error signal e (e.g., the observed behavior of the error signal over time) or a hypothetical setpoint error defined by a hypothetical error signal having known (e.g., specified or selected) characteristics. For example, a user may specify error signal characteristics that the user wishes to set as a threshold for setpoint alarming. Expected value estimator 618 may determine the expected value of the first normalized index $I_1$ that will result from the specified error signal characteristics. In some embodiments, expected value estimator 618 estimates the first normalized index $I_1$ based on attributes of the error signal such as the the mean $\mu$ of the error signal and/or the standard deviation $\sigma$ of the error signal. In other embodiments, expected value estimator 618 estimates the first normalized index $I_1$ based on the control loop agnostic parameters $\kappa$ and $\eta$. As described herein, the variable E[I] represents the expected value of the first normalized index $I_1$.

In some embodiments, expected value estimator 618 estimates the expected values of the first EWMA statistic ewma$_1$ and the second EWMA statistic ewma$_2$ and uses the estimated values for the EWMA statistics to calculate the expected index value E[I]. The expected values for the EWMA statistics may be based on the behavior and/or attributes of the error signal e. In some embodiments, expected value estimator 618 models the error signal e as a Gaussian process with a mean of $\mu$ and a variance of $\sigma^2$.

Under good control, the expected value of the error signal e would be zero (i.e., $\mu=0$). For this case, the expected value for the first EWMA statistic ewma$_1$ is also zero (i.e., E[ewma$_1$]=0). The expected value of the second EWMA statistic ewma$_2$ is more complicated but can be ascertained by noting that the properties of the second EWMA statistic ewma$_2$ are analogous to that of a folded normal distribution. A folded normal distribution relates to the absolute value of a Gaussian variable. If the error signal e is assumed to have Gaussian properties and ewma$_2$ is a measure of the mean of the absolute value of the error signal e, the expected value of ewma$_2$ is therefore equivalent to the mean of the folded normal distribution. The mean of the folded normal distribution is given by the following equation:

$$d(\mu, \sigma^2) = \sigma\sqrt{\frac{2}{\pi}} \exp\left(-\frac{\mu^2}{2\sigma^2}\right) - \mu \, \text{erf}\left(-\frac{\mu}{\sigma\sqrt{2}}\right)$$

where erf( ) is the standard error function. The expected value for the second EWMA statistic ewma$_2$ is equal to d and when $\mu=0$ the previous equation simplifies to:

$$E[ewma_2] = \sigma\sqrt{\frac{2}{\pi}}$$

It is useful to recognize that the EWMAs are discrete-time implementations of first order filters. A continuous-time Laplace representation of a first order filter is given by:

$$Y(s) = \frac{U(s)}{1+\tau s} + \tau \frac{y(0)}{1+\tau s}$$

It can be shown that the response of this filter to a step change in its input is given by:

$$y(t) = u(t)\left(1 - e^{-\frac{t}{\tau}}\right) + y(0)e^{-\frac{t}{\tau}}$$

The previous equation is useful in order to determine how the EWMA statistics would change when a setpoint error develops. For example, consider a change in the expected value of the error signal from zero to $\in$. Expected value estimator 618 may estimate the expected value of ewma$_1$ at time t for a magnitude $\in$ change in the error signal using the following equation:

$$ewma_1(t) = \in\left(1 - e^{-\frac{t}{\tau}}\right)$$

where $\tau$ is the EWMA time constant and e is the Euler's number (i.e., e~2.718). Expected value estimator 618 may estimate the expected value of ewma$_2$ at time t for a magnitude $\in$ change in the error signal using the following equation:

$$ewma_2(t) = d(\epsilon, \sigma^2)\left(1 - e^{-\frac{t}{\tau}}\right) + d(0, \sigma^2)e^{-\frac{t}{\tau}}$$

Expected value estimator 618 may use the expected values of ewma$_1$(t) and ewma$_2$(t) to estimate the expected value of the normalized index $I_1$ at time t using the following equation:

$$E[I] = 1 - \frac{|ewma_1(t)|}{ewma_2(t)} = 1 - \frac{\left|\epsilon\left(1 - e^{-\frac{t}{\tau}}\right)\right|}{d(\epsilon, \sigma^2)\left(1 - e^{-\frac{t}{\tau}}\right) + d(0, \sigma^2)e^{-\frac{t}{\tau}}}$$

where E[I] is the expected value of the normalized index $I_1$ at time t, $\in$ is the magnitude of the setpoint error, $\tau$ is the EWMA time constant, and the function d( ) is the same as previously defined.

Expected value estimator 618 may simplify the previous equation by defining two new parameters as follows:

$$\kappa = \frac{\epsilon}{\sigma} \quad \eta = \frac{t}{\tau}$$

where $\kappa$ is the ratio of the magnitude $\in$ of the setpoint error to the standard deviation $\sigma$ of the error signal, and $\eta$ is the ratio of the amount of time t that the setpoint error has persisted to the EWMA time constant $\tau$. For example, $\kappa=2$ indicates that the setpoint error $\in$ is twice the standard deviation $\sigma$ of the error signal and $\eta=3$ indicates that the setpoint error has persisted for three times the EWMA time constant $\tau$. With these parameters, the equation for E[I] can be rewritten as follows:

$$E[I] = 1 - \frac{|\kappa(1 - e^{-\eta})|}{\left[\sqrt{\frac{2}{\pi}}e^{-\frac{\kappa^2}{2}} - \kappa\,\mathrm{erf}\left(-\frac{\kappa}{\sqrt{2}}\right)\right](1 - e^{-\eta}) + \sqrt{\frac{2}{\pi}}e^{-\eta}}$$

The preceding equation defines E[I] as a function of the parameters $\kappa$ and $\eta$. Advantageously, these parameters are control loop agnostic, which allows E[I] to be defined in terms of parameters that are not dependent on any parameters or attributes specific to a particular control loop. This means that the expected value E[I] can be determined by specifying values for $\kappa$ and $\eta$ without requiring knowledge of control loop specific parameters such as the standard deviation $\sigma$ of the error signal under good control or the EWMA time constant $\tau$.

Still referring to FIG. 8, process controller 601 is shown to include a threshold generator 620. Threshold generator 620 may receive the equation for E[I] from expected value estimator 618. Threshold generator 620 may use the equation for E[I] to determine one or more thresholds for the first normalized index $I_1$. For example, threshold generator 620 may use the values $\kappa=4$ and $\eta=5$ to determine the expected value E[I] that results from a setpoint error that is four times the standard deviation $\sigma$ of the error signal that persists for five times the EWMA time constant $\tau$. Advantageously, since $\kappa$ and $\eta$ are control loop agnostic, the expected value E[I] can be estimated even if the values for $\sigma$ and $\tau$ are unknown.

In some embodiments, threshold generator 620 receives values for $\kappa$ and $\eta$ from communications interface 602 and uses the values for $\kappa$ and $\eta$ to calculate a value for E[I]. In various embodiments, the values of $\kappa$ and $\eta$ can be specified by a user, received from a supervisory controller, retrieved from memory, or otherwise obtained by threshold generator 620. In some embodiments, threshold generator 620 manipulates and/or adjusts the values for $\kappa$ and $\eta$ to determine the expected values E[I] estimated to result from various combinations of $\kappa$ and $\eta$. For example, threshold generator 620 may generate or receive multiple different values for $\kappa$ and $\eta$ and may use such values to calculate multiple different expected values for E[I]. Each value for E[I] may correspond to a different combination of values for $\kappa$ and $\eta$. Using different values for $\kappa$ allows threshold generator 620 to calculate values for E[I] expected to result from different magnitudes $\in$ of the setpoint error (relative to the standard deviation $\sigma$). Using different values for $\eta$ allows threshold generator 620 to calculate values for E[I] expected to result when the setpoint error has persisted for different amounts of time t (relative to the EWMA time constant $\tau$).

Threshold generator 620 may use the expected value E[I] to generate a threshold $I_{threshold}$ for the normalized index $I_1$. In some embodiments, threshold generator 620 uses the expected value E[I] as the threshold $I_{threshold}$ (i.e., E[I] $=I_{threshold}$). By defining and calculating the threshold $I_{threshold}$ in this way, threshold generator 620 can generate thresholds that correspond to particular combinations of $\kappa$ and $\eta$. For example, it may be desirable to generate a threshold $I_{threshold}$ that indicates when a setpoint error of $\kappa$ standard deviations of the error signal has persisted for $\eta$ times the EWMA time constant. Advantageously, the same threshold $I_{threshold}$ can be generated and used in multiple different control loops, regardless of control loop specific parameters.

In practice, the error signal will have an expected value and a level of uncertainty around its expected value. Threshold generator 620 may use the uncertainty of the error signal to generate confidence intervals around the expected value E[I]. Each confidence interval may be defined by a lower bound and an upper bound. Threshold generator 620 may determine the probability that that the expected value E[I] is between the upper bound and the lower bound based on the uncertainty in the error signal. In some embodiments, threshold generator 620 uses the confidence intervals to generate the threshold $I_{threshold}$. For example, threshold generator 620 may set $I_{threshold}$ equal to the minimum bound of the confidence interval to limit the probability of false alarms to a known or specified probability $\alpha$ (e.g., 5%, 1%, 0.1%, etc.). By setting the threshold $I_{threshold}$ to the minimum bound of the confidence interval, the actual value of the normalized index $I_1$ has a predetermined probability 1-$\alpha$ to be greater than $I_{threshold}$ under normal control (e.g., when the threshold conditions $\kappa$ and $\eta$ are not satisfied). In other words, a value of $I_1 < I_{threshold}$ indicates that the setpoint error of at least $\kappa$ times the standard deviation of the error signal has persisted for at least $\eta$ times the EWMA time constant. If $I_{threshold}$ is set to the lower bound of the confidence interval, the probability that this indication is a false alarm is limited to the predetermined false alarm probability $\alpha$.

Still referring to FIG. 8, process controller 601 is shown to include an alarm manager 622. Alarm manager 622 is shown receiving the normalized index $I_1$ from normalized index generator 616 and receiving the threshold $I_{threshold}$ from threshold generator 620. Alarm manager 622 may be configured to generate alarms based on the value of the normalized index $I_1$ relative to the threshold $I_{threshold}$. In some embodiments, alarm manager compares the normalized index $I_1$ to the threshold $I_{threshold}$ to determine whether $I_1 < I_{threshold}$. If the normalized index $I_1$ is less than the threshold $I_{threshold}$, alarm manager 622 may generate an alarm. As previously discussed, the normalized index $I_1$ will be less than the threshold $I_{threshold}$ when a setpoint error of at least $\kappa$ times the standard deviation $\sigma$ of the error signal has persisted for at least $\eta$ times the EWMA time constant $\tau$. This will be true regardless of the particular values of $\sigma$ and $\tau$.

In some embodiments, alarm manager 622 provides an indication of the alarm to communications interface 622. The alarm indication may be provided to client device 624, a supervisory controller, a building management system, a fault detection and diagnostic system, external monitoring and reporting applications, or other external systems or devices. In some embodiments, process controller 601 uses the alarm indication to adjust the control output u generated by adaptive feedback controller 612. For example, the presence of an alarm may indicate poor setpoint tracking that can be corrected by adjusting the control output u. In some embodiments, the alarm indication triggers process controller 601 to update a model or control algorithm used by adaptive feedback controller 612. For example, the alarm indication may cause adaptive feedback controller 612 to update the control parameters $K_c$ and $T_i$ used by adaptive feedback controller 612 to calculate control output u. It is contemplated that the alarm indication may be used in a variety of ways to document setpoint tracking errors, detect and diagnose faults, and respond to detected faults by taking corrective action.

Setpoint Alarming Example

Figure 9:
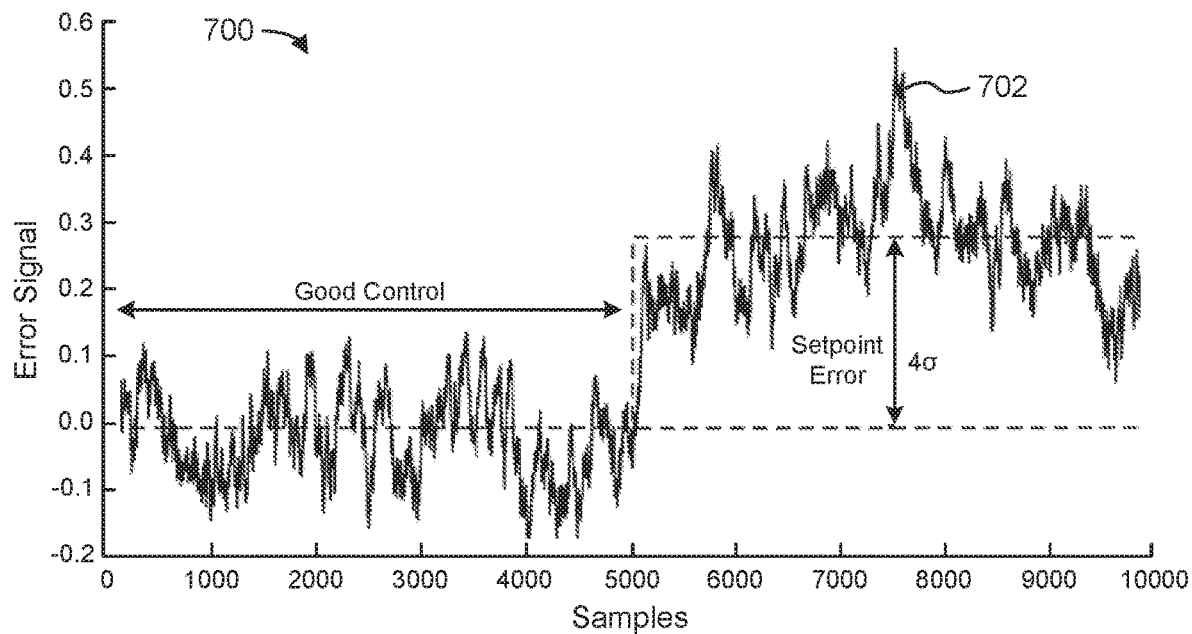
FIG. 9 is a graph of an error signal over time illustrating a persistent setpoint error, according to an exemplary embodiment.
Figure 10:
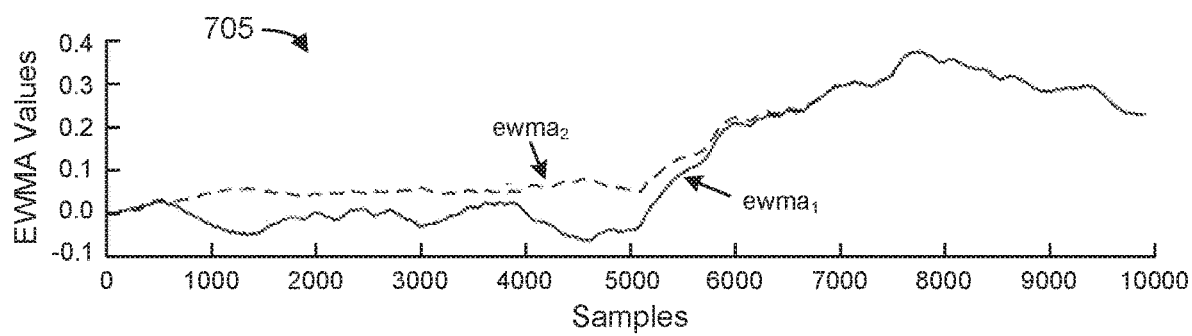
FIG. 10 is a graph of the EWMA statistics that result from the error signal shown in FIG. 9, according to an exemplary embodiment.
Figure 11:
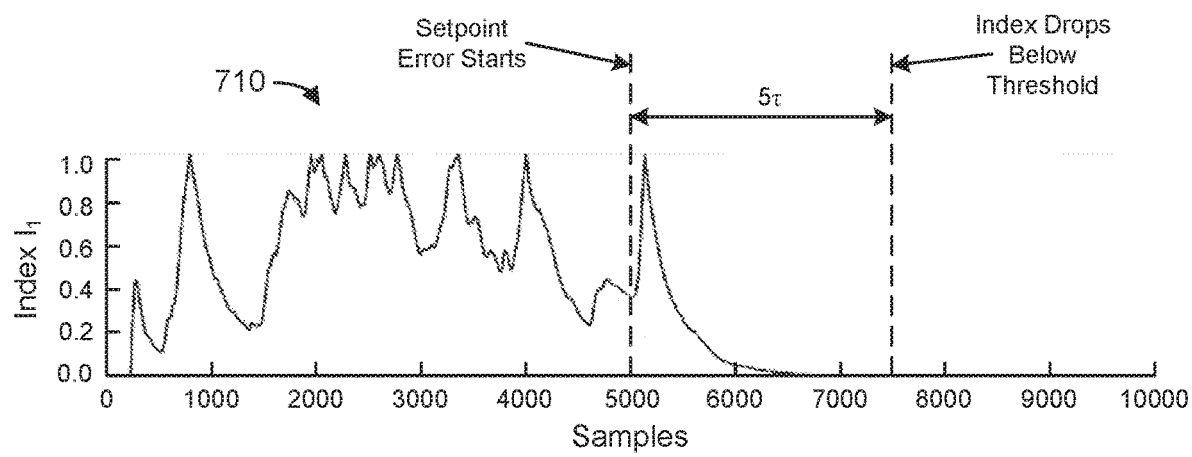
FIG. 11 is a graph of the first normalized performance index $I_1$ that results from the EWMA statistics shown in FIG. 10, according to an exemplary embodiment.

Referring now to FIGS. 9-11, several graphs 700, 705, and 710 illustrating the use of normalized performance indices for setpoint alarming are shown, according to an exemplary embodiment. FIG. 9 illustrates an exemplary error signal 702 for a simulated control loop. Error signal 702 may be calculated by error calculator 610 as previously described. In this example, the time constant of the simulated control loop was set to 100 samples and the EWMA time constants were set to 500 samples each (i.e., $\tau$=500). Between 0 samples and 5,000 samples, the value of error signal 702 fluctuates around zero with a standard deviation of $\sigma$. At 5,000 samples, the expected value (i.e., mean value) of error signal 702 is shifted by $4\sigma$. Between 5,000 samples and 10,000 samples, error signal 702 has a setpoint error of $4\sigma$.

FIG. 10 illustrates the values of $ewma_1$ and $ewma_2$ that result from error signal 702. The values of $ewma_1$ and $ewma_2$ may be calculated by EWMA calculator 614 as previously described. Between 0 samples and 5,000 samples (i.e., under good control), the value of $ewma_1$ fluctuates around zero, whereas the value of $ewma_2$ is always positive. At 5,000 samples, the setpoint error begins and the values of $ewma_1$ and $ewma_2$ begin approaching the same positive value. Between 5,000 samples and 10,000 samples, the gap between $ewma_1$ and $ewma_2$ decreases as the setpoint error persists.

FIG. 11 illustrates the value of the normalized index $I_1$ that results from $ewma_1$ and $ewma_2$. The value of index $I_1$ may be calculated by normalized index generator 616 as previously described. Between 0 samples and 5,000 samples (i.e., under good control), the value of $I_1$ fluctuates between approximately 0.2 and 1.0. At 5,000 samples, the setpoint error begins and the value of $I_1$ begins approaching zero. Between 5,000 samples and 10,000 samples, the index $I_1$ decreases as the setpoint error persists and the gap between $ewma_1$ and $ewma_2$ decreases.

As discussed with reference to FIG. 7, the index $I_1$ can be used for setpoint alarming by comparing $I_1$ to a threshold $I_{threshold}$. For example, alarm manager 622 may generate an alarm when the value of $I_1$ drops below the threshold $I_{threshold}$. The value of $I_{threshold}$ may be calculated by threshold generator 620 based on specified values for $\kappa$ and $\eta$ as previously described. In this example, the values of $\kappa$ and $\eta$ were specified as follows:

$\kappa=4, \eta=5$ which results in a threshold $I_{threshold}$ that represents the expected value of $I_1$ when a setpoint error of 4 times the standard deviation of error signal 702 (i.e., $4\sigma$) persists for 5 times the EWMA time constant (i.e., $5\tau$). Threshold generator 620 may use the values $\kappa=4$ and $\eta=5$ as inputs to the following equation to calculate $I_{threshold}$:

$$I_{threshold} = 1 - \frac{|\kappa(1-e^{-\eta})|}{\left[\sqrt{\frac{2}{\pi}}e^{-\frac{\kappa^2}{2}} - \kappa \operatorname{erf}\left(-\frac{\kappa}{\sqrt{2}}\right)\right](1-e^{-\eta}) + \sqrt{\frac{2}{\pi}}e^{-\eta}}$$

which results in a value of $I_{threshold}=0.0014$.

As shown in FIG. 11, the value of index $I_1$ drops below the threshold $I_{threshold}=0.0014$ at approximately 7,500 samples, which is 2,500 samples after the setpoint error begins (i.e., 7,500−5,000=2,500). This time corresponds to five times the EWMA time constant $\tau$, which was set to 500 samples (i.e., 5×500=2,500). In other words, the index $I_1$ drops below the threshold $I_{threshold}$ when the setpoint error of $4\sigma$ has persisted for $5\tau$. This is consistent with the values of $\kappa$ and $\eta$ used to calculate the threshold $I_{threshold}$ (i.e., $\kappa=4$ and $\eta=5$).

Setpoint Alarming Process

Figure 12:
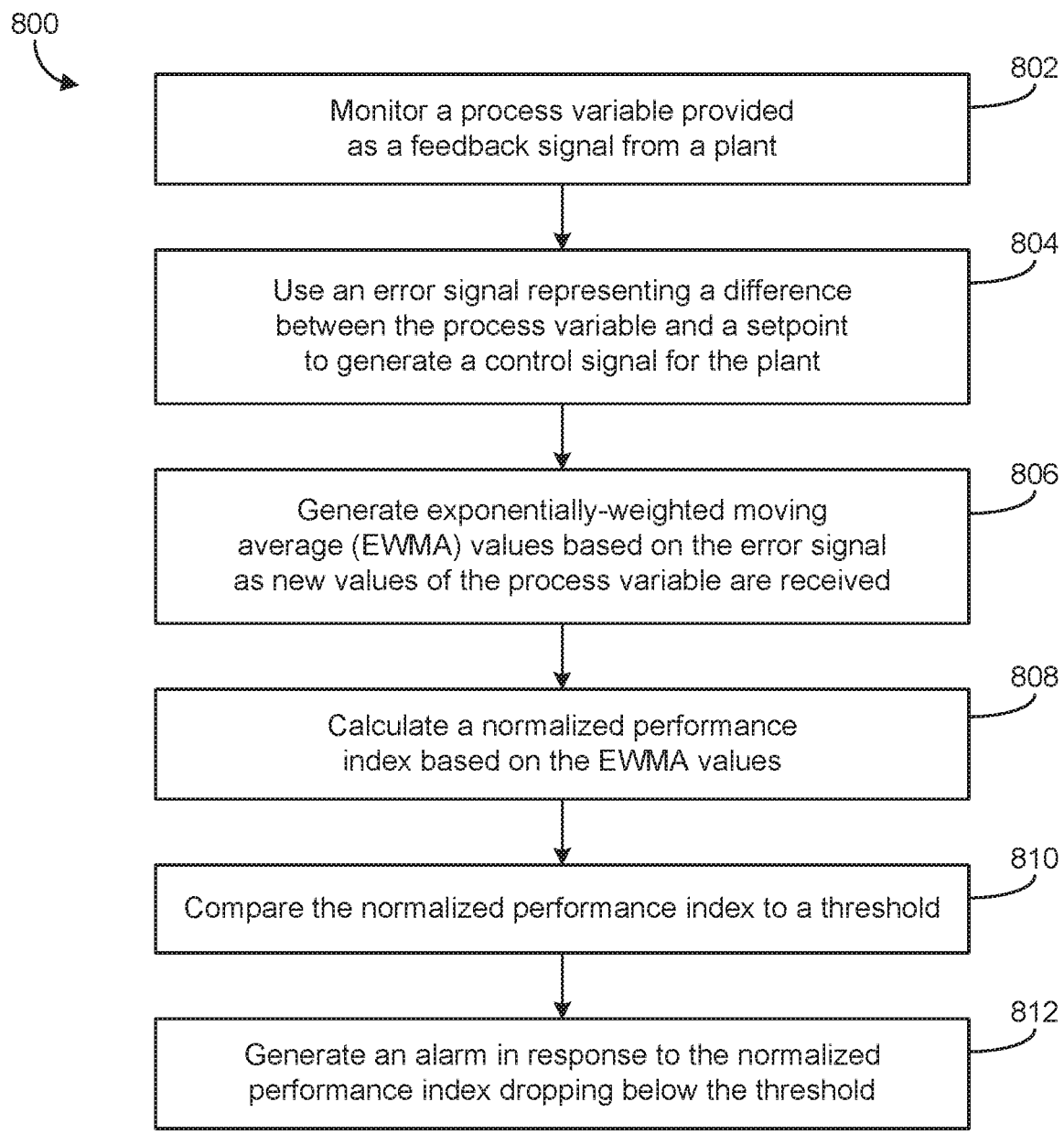
FIG. 12 is a flowchart of a setpoint alarming process, according to an exemplary embodiment.

Referring now to FIG. 12, a flowchart of a setpoint alarming process 800 is shown, according to an exemplary embodiment. Process 800 may be performed by one or more components of closed-loop control system 600, as described with reference to FIG. 8. For example, process 800 may be performed by process controller 601 and/or various components thereof.

Process 800 is shown to include monitoring a process variable provided as a feedback signal from a plant (step 802) and using an error signal representing a difference between the process variable and a setpoint to generate a control signal for the plant (step 804). In some embodiments, steps 802 and 804 are performed by error calculator 610. Step 804 may include subtracting the value of the process variable y from the feedback signal r to generate a current value of the error signal e.

Process 800 is shown to include generating exponentially-weighted moving average (EWMA) values based on the error signal as new values of the process variable are received (step 806). In some embodiments, step 806 is performed by EWMA calculator 614. Step 806 may include calculating a first EWMA value (i.e., $ewma_{1,k}$) of unmodified error signal samples using the following equation:

$$ewma_{1,k} = ewma_{1,k-1} + \frac{e_k - ewma_{1,k-1}}{\min(k, W)}$$

where $ewma_{1,k-1}$ is the value of the first EWMA at the previous time step (k−1), $e_k$ is the value of the error signal at the current time step k, and W is the effective number of samples used in the weighted averages (e.g., the forgetting window). The use of the minimum in the denominator of the update term causes the EWMA value to begin as a straight average until the number of samples reaches the window size, at which point the statistic becomes exponentially-weighted. In some embodiments, step 806 includes calculating the first EWMA value using the following equation:

$$ewma_{1,k} = \left(1 - \frac{1}{W}\right)ewma_{1k-1} + \frac{1}{W}e_k$$

Step 806 may include calculating a second EWMA value (i.e., $ewma_{2,k}$) of the absolute value of the error signal using the following equation:

$$ewma_{2,k} = ewma_{2,k-1} + \frac{|e_k| - ewma_{2,k-1}}{\min(k, W)}$$

where $ewma_{2,k-1}$ is the value of the second EWMA at the previous time step k−1 and $|e_k|$ is the absolute value of the error signal at the current time step k. In some embodiments, step 806 includes calculating the second EWMA value using the following equation:

$$ewma_{2,k} = \left(1 - \frac{1}{W}\right)ewma_{2,k-1} + \frac{1}{W}|e_k|$$

Examination of the EWMA statistics generated in step 806 shows that $ewma_1$ should have an expected value of zero when the plant is under control and when deviations about setpoint r are expected to be distributed evenly above and below setpoint r. For example, the positive errors are expected to cancel the negative errors over time, thereby resulting in an $ewma_1$ value that approaches zero. Conversely, $ewma_2$ will always have an expected value greater than zero because $ewma_2$ represents an average absolute value of the error. Since all of the $ewma_2$ values are positive, error cancelling does not occur. Small values of $ewma_2$ indicate close setpoint tracking and large values of $ewma_2$ indicate poor setpoint tracking.

Process 800 is shown to include calculating a normalized performance index based on the EWMA values (step 808). In some embodiments, step 808 is performed by normalized index generator 616. Step 808 may include calculating the first normalized index $I_1$ using the following equation:

$$I_1 = 1 - \frac{|ewma_1|}{ewma_2}$$

where the numerator is the absolute value of $ewma_1$ and the denominator is $ewma_2$.

The index $I_1$ is designed to detect problems in a control loop (e.g., a failure to track a setpoint) by evaluating the symmetry of the process variable y around setpoint r. The assumption underlying the first normalized index $I_1$ is that disturbances acting on a control loop are drawn from a symmetrical distribution. Under this assumption, the controlled variable y is expected to fluctuate equally (over the long term) both above and below the setpoint r. When a problem arises, the controlled variable y may be unable to reach the setpoint r, thereby violating this assumption.

The numerator in the equation for $I_1$ (i.e., $|ewma_1|$) will approach zero when the deviations about setpoint r are distributed evenly above and below setpoint r, thereby causing the value of index $I_1$ to approach one. However, when a control problem occurs and the controlled variable y is unable to reach setpoint r, the numerator (i.e., $|ewma_1|$) and denominator (i.e., $ewma_2$) will approach the same value and index $I_1$ will approach zero. The first normalized index $I_1$ is naturally normalized between zero and one. Values of $I_1$ that are close to zero indicate poor control, whereas values of $I_1$ close to one indicate good control. This normalization allows control loops of various types to be compared on the same scale.

Process 800 is shown to include comparing the normalized performance index to a threshold (step 810). In some embodiments, step 810 is performed by alarm manager 622. In various embodiments, the threshold may be the expected value E[I] generated by expected value estimator 618, a lower confidence bound on the expected value E[I], and/or the threshold $I_{threshold}$ generated by threshold generator 620. For example, the threshold may be an estimated value of the normalized performance index expected to occur when a setpoint error of a predetermined magnitude has persisted for a predetermined duration. Advantageously, the threshold may be control loop agnostic, meaning that the threshold does not depend on any variables or parameters that are specific to the feedback control system.

In some embodiments, the threshold represents an expected value of the normalized performance index when a setpoint error of a predetermined magnitude has persisted for a predetermined duration. The predetermined magnitude may be specified as a multiple of a standard deviation of the error signal without requiring knowledge of the standard deviation. Similarly, the predetermined duration may be specified as a multiple of a time constant of the EWMA values without requiring knowledge of the time constant. This allows the threshold to be calculated based on the specified alarm parameters (e.g., parameters κ and η) without requiring knowledge of any control loop specific parameters or variables.

In some embodiments, the threshold is a function of a first alarm parameter κ and a second alarm parameter η. The first alarm parameter κ may represent a ratio of a magnitude of a persistent setpoint error to a standard deviation of the error signal. The second alarm parameter η may represent a ratio of a duration for which the setpoint error has persisted to a time constant of the EWMA values.

Process 800 is shown to include generating an alarm in response to the normalized performance index dropping below the threshold (step 812). In some embodiments, step 812 is performed by alarm manager 622. As previously discussed, the normalized index $I_1$ will be less than the threshold $I_{threshold}$ when a setpoint error of at least κ times the standard deviation σ of the error signal has persisted for at least η times the EWMA time constant τ. This will be true regardless of the particular values of σ and τ. Step 812 may include comparing the normalized index $I_1$ to the threshold $I_{threshold}$ to determine whether $I_1 < I_{threshold}$. If the normalized index $I_1$ is less than the threshold $I_{threshold}$, step 812 may include generating an alarm.

In some embodiments, step 812 includes providing an indication of the alarm to a client device, a supervisory controller, a building management system, a fault detection and diagnostic system, external monitoring and reporting applications, or other external systems or devices. In some embodiments, step 812 includes using the alarm indication to adjust the control output u generated by the feedback controller. For example, the presence of an alarm may indicate poor setpoint tracking that can be corrected by adjusting the control output u. In some embodiments, the alarm indication triggers the feedback controller to update a model or control algorithm used by the feedback controller. For example, the alarm indication may cause the feedback controller to update the control parameters $K_c$ and $T_i$ used to calculate control output u. It is contemplated that the alarm indication may be used in a variety of ways to document setpoint tracking errors, detect and diagnose faults, and respond to detected faults by taking corrective action.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A feedback control system comprising:
   a plant comprising equipment operable to affect a variable state or condition of the plant in response to a control signal;
   a feedback controller configured to monitor a process variable received via a feedback signal from the plant and use an error signal representing a setpoint error between the process variable and a setpoint to generate the control signal for the plant;
   an exponentially-weighted moving average (EWMA) calculator configured to generate EWMA values based on the setpoint error as new values of the process variable are received;
   a normalized index generator configured to use the EWMA values to calculate a normalized performance index;
   a threshold generator configured to generate a threshold based on a first alarm parameter κ representing a normalized magnitude of the setpoint error and a second alarm parameter η representing a normalized duration that the setpoint error has persisted; and
   an alarm manager configured to generate an alarm in response to the normalized performance index crossing the threshold.

2. The feedback control system of claim 1, wherein the threshold is control loop agnostic and does not depend on any variables or parameters that are specific to the feedback control system.

3. The feedback control system of claim 1, wherein the threshold represents an expected value of the normalized performance index when the setpoint error exceeds a predetermined magnitude and has persisted for a predetermined duration.

4. The feedback control system of claim 3, wherein:
   the predetermined magnitude is specified as a multiple of a standard deviation of the error signal without requiring knowledge of the standard deviation; and
   the predetermined duration is specified as a multiple of a time constant of the EWMA values without requiring knowledge of the time constant.

5. The feedback control system of claim 1, wherein:
   the first alarm parameter κ is a ratio of a magnitude of the setpoint error to a standard deviation of the error signal; and
   the second alarm parameter η is a ratio of a duration for which the setpoint error has persisted to a time constant of the EWMA values.

6. The feedback control system of claim 1, wherein the threshold generator is configured to use predetermined values for the alarm parameters κ and η to generate the threshold without requiring knowledge of any variables or parameters that are specific to the feedback control system.

7. The feedback control system of claim 1, further comprising an expected value estimator configured to estimate a value of the normalized performance index expected to occur when a setpoint error of a predetermined magnitude has persisted for a predetermined duration;
wherein the threshold is based on the expected value of the normalized performance index.

8. The feedback control system of claim 1, further comprising an error calculator configured to receive the process variable from the plant and compare the process variable with the setpoint to generate the error signal.

9. A method for using a normalized performance index for setpoint alarming in a feedback control system, the method comprising:
operating equipment of a plant to affect a variable state or condition of the plant in response to a control signal;
monitoring a process variable received via a feedback signal from the plant;
using an error signal representing a setpoint error between the process variable and a setpoint to generate the control signal for the plant;
generating exponentially-weighted moving average (EWMA) values based on the setpoint error as new values of the process variable are received;
calculating a normalized performance index based on the EWMA values;
generating a threshold based on a first alarm parameter $\kappa$ representing a normalized magnitude of the setpoint error and a second alarm parameter $\eta$ representing a normalized duration that the setpoint error has persisted; and
generating an alarm in response to the normalized performance index crossing the threshold.

10. The method of claim 9, wherein the threshold is control loop agnostic and does not depend on any variables or parameters that are specific to the feedback control system.

11. The method of claim 9, wherein the threshold represents an expected value of the normalized performance index when the setpoint error exceeds a predetermined magnitude and has persisted for a predetermined duration.

12. The method of claim 11, wherein:
the predetermined magnitude is specified as a multiple of a standard deviation of the error signal without requiring knowledge of the standard deviation; and
the predetermined duration is specified as a multiple of a time constant of the EWMA values without requiring knowledge of the time constant.

13. The method of claim 9, wherein:
the first alarm parameter $\kappa$ is a ratio of a magnitude of the setpoint error to a standard deviation of the error signal; and
the second alarm parameter $\eta$ is a ratio of a duration for which the setpoint error has persisted to a time constant of the EWMA values.

14. The method of claim 9, wherein generating the threshold comprises using predetermined values for the alarm parameters $\kappa$ and $\eta$ without requiring knowledge of any variables or parameters that are specific to the feedback control system.

15. The method of claim 9, further comprising estimating a value of the normalized performance index expected to occur when a setpoint error of a predetermined magnitude has persisted for a predetermined duration;
wherein the threshold is based on the expected value of the normalized performance index.

16. The method of claim 9, comprising receiving the process variable from the plant and comparing the process variable with the setpoint to generate the error signal.

17. One or more non-transitory computer-readable media containing program instructions that, when executed by one or more processors, cause the one or more processors to perform operations comprising:
operating equipment of a plant to affect a variable state or condition of the plant in response to a control signal;
monitoring a process variable received via a feedback signal from the plant;
using an error signal representing a setpoint error between the process variable and a setpoint to generate the control signal for the plant;
generating exponentially-weighted moving average (EWMA) values based on the setpoint error as new values of the process variable are received;
calculating a normalized performance index based on the EWMA values;
generating a threshold based on a first alarm parameter $\kappa$ representing a normalized magnitude of the setpoint error and a second alarm parameter $\eta$ representing a normalized duration that the setpoint error has persisted; and
generating an alarm in response to the normalized performance index crossing the threshold.

18. The one or more non-transitory computer-readable media of claim 17, wherein the normalized performance index is control loop agnostic and does not depend on any variables or parameters that are specific to the plant.

19. The one or more non-transitory computer-readable media of claim 17, wherein:
the normalized magnitude is specified as a multiple of a standard deviation of the error signal without requiring knowledge of the standard deviation; and
the normalized duration is specified as a multiple of a time constant of the error signal without requiring knowledge of the time constant.

20. The one or more non-transitory computer-readable media of claim 17, wherein:
the first alarm parameter $\kappa$ is a ratio of a magnitude of the setpoint error to a standard deviation of the error signal; and
the second alarm parameter $\eta$ is a ratio of a duration for which the setpoint error has persisted to a time constant of the error signal.

* * * * *